(12) United States Patent
Yuzurihara et al.

(10) Patent No.: US 11,799,373 B2
(45) Date of Patent: Oct. 24, 2023

(54) DC PULSE POWER SUPPLY DEVICE

(71) Applicant: KYOSAN ELECTRIC MFG. CO., LTD., Yokohama (JP)

(72) Inventors: Itsuo Yuzurihara, Yokohama (JP); Toshiyuki Adachi, Yokohama (JP); Tomohiro Yoneyama, Yokohama (JP); Koichi Miyazaki, Yokohama (JP)

(73) Assignee: KYOSAN ELECTRIC MFG. CO., LTD., Yokohama (JP)

( * ) Notice: Subject to any disclaimer, the term of this patent is extended or adjusted under 35 U.S.C. 154(b) by 240 days.

(21) Appl. No.: 17/422,506

(22) PCT Filed: Nov. 8, 2019

(86) PCT No.: PCT/JP2019/043837
§ 371 (c)(1),
(2) Date: Jul. 13, 2021

(87) PCT Pub. No.: WO2020/152948
PCT Pub. Date: Jul. 30, 2020

(65) Prior Publication Data
US 2022/0094261 A1 Mar. 24, 2022

(30) Foreign Application Priority Data
Jan. 24, 2019 (JP) .................................. 2019-010638

(51) Int. Cl.
*H02M 1/34* (2007.01)
*H02M 1/00* (2006.01)
(Continued)

(52) U.S. Cl.
CPC ........... *H02M 1/342* (2021.05); *H02M 1/007* (2021.05); *H02M 1/0064* (2021.05);
(Continued)

(58) Field of Classification Search
CPC ..... G05F 1/00; G05F 1/10; G05F 1/12; G05F 1/46; G05F 1/455; G05F 1/45;
(Continued)

(56) References Cited

U.S. PATENT DOCUMENTS

| 4,395,675 A | 7/1983 | Toumani |
| 5,943,200 A * | 8/1999 | He .................. H02M 3/155 361/115 |

(Continued)

FOREIGN PATENT DOCUMENTS

| JP | 58-079470 A | 5/1983 |
| JP | 1-252165 A | 10/1989 |

(Continued)

OTHER PUBLICATIONS

Extended European Search Report dated Sep. 1, 2022, issued in counterpart EP Application No. 19911246.7. (11 pages).

(Continued)

*Primary Examiner* — Jeffrey A Gblende
(74) *Attorney, Agent, or Firm* — WHDA, LLP

(57) ABSTRACT

This DC pulse power supply device includes: a DC power supply unit (10); and a pulsing unit (20) that generates a pulse output using a step-up chopper circuit connected to the DC power supply unit. A clamp voltage unit (30) has an output end that is connected to a connection point (s) between a switching element (22) and a DC reactor (21), and applies a clamp voltage (VC) to one end of the switching element (22). During an off period (Toff) of the step-up chopper circuit, the voltage at both ends of the switching element is clamped so as to prevent damage to the switching element, suppress output voltage fluctuations resulting from load current fluctuations, and suppress power loss caused by a load current and a discharge current flowing through a resistor.

8 Claims, 11 Drawing Sheets

(51) Int. Cl.
*H02M 3/335* (2006.01)
*H02M 3/156* (2006.01)
*H02M 7/537* (2006.01)

(52) U.S. Cl.
CPC ....... *H02M 3/156* (2013.01); *H02M 3/33573* (2021.05); *H02M 7/537* (2013.01)

(58) Field of Classification Search
CPC ... G05F 1/445; G05F 1/66; G05F 1/40; G05F 1/42; G05F 1/44; G05F 1/462; G05F 1/52; G05F 1/56; G05F 3/10; G05F 3/16; G05F 3/18; G05F 3/185; G05F 3/20; G05F 3/26; G05F 3/30; G05F 3/205; G05F 3/22; G05F 3/24; G05F 3/222; G05F 3/242; G05F 3/225; G05F 3/227; G05F 3/245; G05F 3/247; G05F 3/262; G05F 3/265; G05F 3/267; G05F 1/575; H02M 5/2573; H02M 1/081; H02M 5/293; H02M 7/12; H02M 3/10; H02M 3/125; H02M 3/13; H02M 3/135; H02M 3/145; H02M 3/15; H02M 3/155; H02M 3/156; H02M 3/157; H02M 3/158; H02M 3/1588; H02M 2003/1566; H02M 3/1582; H02M 3/1584; H02M 2003/1557; H02M 1/0032; H02M 1/4225; H02M 7/217; H05B 39/048; B23K 11/24; H04B 2215/069

See application file for complete search history.

(56) References Cited

U.S. PATENT DOCUMENTS

| | | | | |
|---|---|---|---|---|
| 6,043,636 | A | 3/2000 | Gaudreau et al. | |
| 6,822,427 | B2 | 11/2004 | Wittenbreder | |
| 7,023,186 | B2 | 4/2006 | Yan | |
| 7,915,876 | B2* | 3/2011 | Orr | H02M 3/155 323/259 |
| 8,912,768 | B1* | 12/2014 | Cho | H02M 3/155 323/222 |
| 9,712,055 | B1* | 7/2017 | Swartz | H02M 3/158 |
| 9,780,642 | B2 | 10/2017 | Skinner et al. | |
| 9,780,676 | B2 | 10/2017 | Kolar et al. | |
| 2004/0004848 | A1* | 1/2004 | Yuzurihara | H02M 3/3376 363/16 |
| 2007/0053217 | A1 | 3/2007 | Darroman | |
| 2011/0090716 | A1* | 4/2011 | Asuke | H02M 1/34 363/21.01 |
| 2015/0085534 | A1 | 3/2015 | Abramovitz et al. | |
| 2017/0244330 | A1 | 8/2017 | Kolar et al. | |

FOREIGN PATENT DOCUMENTS

| | | |
|---|---|---|
| JP | 4-161064 A | 6/1992 |
| JP | 5-327089 A | 12/1993 |
| JP | 8-222258 A | 8/1996 |
| JP | 2002-218743 A | 8/2002 |
| JP | 2004-080880 A | 3/2004 |
| JP | 2004-254401 A | 9/2004 |
| JP | 2006-6053 A | 1/2006 |
| JP | 2012-196080 A | 10/2012 |

OTHER PUBLICATIONS

Lu, Dylan Dah-Chuan et al: "A single-switch continuous-conduction-mode boost converter with reduced reverse-recovery and switching losses", IEEE Transactions on Industrial Electronics, IEEE Service Center, Piscataway, NJ, USA, vol. 50, No. 4, Aug. 1, 2003 (Aug. 1, 2003), pp. 767-776, XP011098992; Cited in Extended European Search Report dated Sep. 1, 2022. (10 pages).
John Mankowski et al: "A Review of Short Pulse Generator Technology", IEEE Transactions on Plasma Science, IEEE Service Center, Piscataway, NJ, US, vol. 28, No. 1, Feb. 1, 2000 (Feb. 1, 2000), XP011045459; Cited in Extended European Search Report dated Sep. 1, 2022. (7 pages).
Office Action dated Jan. 31, 2023, issued in counterpart TW Application No. 109100314, with English Translation. (15 pages).
International Search Report dated Dec. 17, 2019, issued in counterpart application No. PCT/JP2019/043837 (2 pages).
Office Action dated May 26, 2023, issued in counterpart KR Application No. 10-2021-7021136, with English Translation. (9 pages).
N. Vazquez et al., "The Tapped-Inductor Boost Converter", Nov. 5, 2007, IEEE, International Symposium on Industrial Electronics; Cited in KR Office Action dated May 26, 2023.

* cited by examiner (a)

(b)

(c)

(d)

DC PULSE POWER SUPPLY DEVICE

TECHNICAL FIELD

The present invention relates to a DC pulse power supply device that supplies a pulse output to a load.

BACKGROUND ART

A pulse output from a DC pulse power supply device is a high-frequency (RF) output that continuously turns on and off a DC voltage in a range of several Hz to hundreds kHz.

The DC pulse power supply device is used for supplying the pulse output to a load of a plasma generation device, an exciting of a pulse laser, an electrical discharge machine or similar. In the case of using the DC power supply device as plasma generation device, the pulse output is supplied between electrodes in a plasma generating chamber, so as to ignite plasma generated by the electrical discharge occurring between the electrodes and keep the generated plasma.

FIG. 11(a) shows a configuration example of the DC pulse power supply device. It is known that a DC pulse power supply device has a step-up chopper circuit as a circuit for generating a pulse form. A DC pulse power supply device 100 consists of a DC power supply 110 and a step-up chopper circuit 120, the DC power supply 110 supplying to a load 130 with a pulse output obtained by boosting a DC voltage by the step-up chopper circuit 120 (see Patent Literatures 1 and 2).

FIG. 11(b) illustrates a configuration example of the step-up chopper circuit (see Patent Literature 3). The step-up chopper circuit 120 is configured by connecting an inductor 121 in series between the DC power supply and the load while connecting a switching element 122 in parallel to the load, so as to form a pulse output that is boosted in accordance with a duty ratio of a time width between an ON period and an OFF period of the switching element 122. In the above ON/OFF operation, energy is accumulated in a DC reactor of the inductor 121 depending on the time width of the ON period, thereby forming a pulse output with amplitude boosted according to the accumulated energy. The amplitude of the pulse output to be boosted is defined depending on the duty ratio between the ON period and OFF period of the switching element, and at OFF point of the switching element 122, vibration or others created due to a leakage inductance in the DC reactor generates a surge voltage that exceeds the defined amplitude.

In the step-up chopper circuit shown in FIG. 11(b), a series circuit consisting of a diode 123 with the same polarity as the power supply and a resistor 124 is connected in parallel to the inductor 121 to allow the resistor 124 to consume a reverse voltage generated by the energy accumulated in the inductor 121, thereby suppressing the surge voltage generated by excessive rise in the voltage.

In addition to the above method of suppressing the surge voltage with a resistor, there is another known method for suppressing the surge voltage by absorbing the surge voltage by a snubber capacitor of a snubber circuit (see Patent Literature 4). FIG. 11(c) shows a configuration example of a step-up chopper circuit having a switching element 127, in which the chopper circuit is connected to a DC power supply 125 and configured to turn on the switching element 127 to accumulate energy in a DC reactor 126, charge the accumulated energy during an OFF period of the switching element 127 into an output-side capacitor 128 so as to enable the DC power supply 125 to supply a high voltage to a load, and absorb a surge voltage generated at OFF point of the switching element 127 by a snubber capacitor to thereby preventing the switching element 127 from breakdown due to an excessive voltage.

CITATION LIST

Patent Literature

[Patent Literature 1] Japanese Patent Laid-Open Publication No. 222258/1996 (FIG. 1, Paragraph 0012)
[Patent Literature 2] Japanese Patent Laid-Open Publication No. 2006-6053 (FIG. 1)
[Patent Literature 3] Japanese Patent Laid-Open Publication No. 252165/1989 (FIG. 1)
[Patent Literature 4] Japanese Patent Laid-Open Publication No. 2004-254401 (Paragraphs 0005 and 0010, FIG. 5)

SUMMARY OF INVENTION

Problems to be Solved by the Invention

When a surge voltage is generated, a voltage between a drain and a source of the switching element becomes excessive due to the surge voltage that may cause damage to the switching element. As to a method for suppressing the surge voltage, there is (i) a method for suppressing the surge voltage by using a resistor, or (ii) a method using a snubber circuit, by way of example. However, there are drawbacks, such as fluctuations in an output voltage and power loss.

(i) In a method that uses a resistor to consume discharged accumulated energy of an inductance to suppress a surge voltage, the accumulated energy of an inductance L creates a rector voltage VDCL, and thereby a resistance voltage VR at approximately the same level as the reactor voltage VDCL is generated in a resistor R connected in parallel to the inductance. The resistor R suppresses the surge voltage rapidly rising due to the discharge of the accumulated energy of the inductance and a surge voltage generated by turning ON/OFF a switching element.

FIG. 11(d) shows an output voltage Vo in a pulse cycle. During an ON period Ton in which the switching element is in an ON state, the output voltage Vo is a conducting voltage of the switching element, and during an OFF period Toff in which the switching element is in an OFF state, the output voltage Vo is a voltage obtained by adding the resistance voltage VR to a DC voltage VAB in the DC power supply, namely expressed by Vo=VAB+VR. In the circuitry shown in FIG. 11(b), a voltage Vs at an end of a source S of the switching element 122 is at the same level as the output voltage Vo. Although the resistor R can suppress the surge voltage with low resistivity, the lower resistivity of the resistor R leads to greater loss in the resistor, because a voltage equivalent to the reactor voltage VDCL is applied. In this way, there is a conflicting relationship between the resistance loss and the surge voltage with respect to the resistance R, and the higher the resistance R is, the smaller the loss due to the resistance, whereas the surge voltage becomes high. On the other hand, the smaller the resistance R is, the smaller the surge voltage is, whereas the resistance loss becomes large.

The reactor voltage VDCL fluctuates depending on a reactor voltage iL (load current Io). Provide that a voltage generated in the resistor R is VR1 when the load current is Io, if the load current fluctuates K times into K×Io, a voltage VR2 generated in the resistor R is VR2=K×VR1. In here, the multiple K fluctuates depending on a duty ratio of the switching element, the conditions of the load current Io and others. Thus, the resistance voltage VR and the output voltage Vo fluctuate due to the surge of the inductance L in consequence of the fluctuation in the duty ratio, the load current Io and others.

Accordingly, the output voltage Vo of the DC pulse power supply device and a terminal voltage of the switching element fluctuate in consequence of the fluctuation in the load current Io. Furthermore, since the resistor R suffers the loss of power, the efficiency of the DC pulse power supply device is lowered.

(ii) In a method for suppressing a surge voltage by absorbing the surge voltage by a snubber capacitor of a snubber circuit, energy absorbed by the snubber capacitor is fed to a snubber discharge resistor for consumption, so that a discharge current flows through the snubber discharge resistor that causes the loss of power, resulting in decrease in the efficiency of the DC pulse power supply device.

Hence, the conventional method for preventing the damage of the switching element due to the surge voltage has problems of the fluctuation in the output voltage and of the loss of power caused by the flow of the current in the resistor.

An object of the present invention is to solve the above-mentioned problems, and to prevent damage to the switching element due to an excessive surge voltage in the DC pulse power supply device.

Another object of the invention is to prevent damage to the switching element, and solve the problem of the fluctuation in the output voltage due to the fluctuation in the load current and the problem of the loss of power caused by the flow of the load current or the discharge current through the resistor.

Means for Solving the Problem

The DC pulse power supply of the present invention clamps a voltage across the reactor during the OFF period of the step-up chopper circuit in order to suppress the surge voltage generated in the reactor and prevent damage to the switching element, also prevent the loss of power caused by the fluctuation in the output voltage due to the fluctuation in the load current and the flow of the load current or discharge current through the resistor.

The DC pulse power supply device of the present invention comprises a DC power supply unit, and a pulsing unit that allows a step-up chopper circuit connected to the DC power supply unit to generate a pulse output. The step-up chopper circuit of the pulsing unit comprises a series circuit consisting of a DC reactor and a switching element, in which a clamp voltage unit is connected to the DC reactor. The clamp voltage unit has its output end connected to a connection point between the DC reactor and the switching element. Thus, a clamp voltage is applied to one end of the switching element.

When the switching element of the step-up chopper circuit is turned from ON to OFF, energy accumulated in the DC reactor when the switching element is in an ON state creates a surge voltage which is an excessive voltage. In an OFF period of the switching element, the clamp voltage unit clamps a voltage across the switching element to a pre-defined voltage. The predefined voltage for clamping is set to be within the range of an allowable voltage of the switching element, so as to prevent the element from break-down due to the surge voltage.

Since the clamp voltage unit is not affected by the fluctuation in the load current, the fluctuation in the output voltage due to the fluctuation in the load current does not occur. Furthermore, the loss of power does not occur in the clamp voltage unit caused by the flow of the load current or discharge current through the snubber circuit.

(Clamp Voltage Unit)

In a configuration example, the clamp voltage unit consists of a regeneration unit. The regeneration unit is connected between both ends of the DC reactor of the step-up chopper circuit, so as to regenerate a component of the reactor voltage of the DC reactor exceeding a set voltage to the DC power supply unit. As the regeneration unit regenerates a component of the voltage exceeding the set voltage to the DC power supply unit, the set voltage serves as a clamp voltage of the clamp voltage unit, thereby clamping a voltage on an end of the DC reactor to which an output end of the clamp voltage unit is connected and a voltage on one end of the switch element to the clamp voltage.

In a configuration example, the regeneration unit comprises a capacitor connected in parallel to the reactor voltage of the pulsing unit, an inverter circuit that performs orthogonal transformation on a capacitor voltage in the capacitor, a transformer that transforms an AC voltage in the inverter circuit, and a rectifier that rectifies an AC voltage in the transformer. The regeneration unit uses the set voltage as a voltage across the capacitor to regenerate a component of the voltage exceeding the voltage across the capacitor to the DC power supply unit. The clamp voltage can be varied based on a transformer ratio of the transformer.

In the circuity in which one end of the regeneration unit is connected to an input end on a low-voltage side of the pulsing unit, a reactor voltage of the DC reactor on the basis of a voltage on the low-voltage side is used as regeneration input voltage.

(DC Reactor)

The DC reactor can be configured in the form of a non-tapped autotransformer, or two DC reactors magnetically coupled can be composed of a tapped autotransformer or a multi-winding transformer.

In the configuration having a second DC reactor to which the DC reactor is magnetically coupled, one end of the DC reactor is connected to an output end of the DC power supply unit, and one end of the second DC reactor is connected to an output end of the pulsing unit, and a connection point between the DC reactor and the second DC reactor is connected to a source of the switching element of the step-up chopper circuit. To the connection point between the DC reactor and the second DC reactor, the output end of the clamp voltage unit is connected.

The clamp voltage unit clamps, when the switching element is in the OFF state, a voltage at the connection point between the end of the DC reactor, to which the output end of the clamp voltage unit is connected, and the second DC reactor, and a voltage on one end of the switching element to the clamp voltage.

The DC reactor can be in the first form in which the DC reactor is arranged on the low-voltage side of the pulsing unit and be in the second form in which the DC reactor is arranged on the high-voltage side of the pulsing unit. In either of the first and second forms, the high-voltage side of the DC reactor is connected to the high-voltage side of the clamp voltage unit (regeneration unit), and the low-voltage side of the DC reactor is connected to the low-voltage side of the clamp voltage unit (regeneration unit). The reactor voltage of the DC reactor is input to the regeneration unit as a regeneration input voltage that is based on a voltage on the low-voltage side of the DC power supply unit.

Effects of the Invention

As described above, according to the present invention, the clamping of the voltage across the switching element in the OFF state of the step-up chopper circuit can prevent damage to the switching element as well as preventing the loss of the power caused by the fluctuation in the output voltage due to the fluctuation in the load current and the flow of the load current or the discharge current through the resistor.

BEST MODE FOR CARRYING OUT THE INVENTION

A DC pulse power supply device of the present invention, clamping of a voltage across a switching element in an OFF state of a step-up chopper circuit can prevent damage to a switching element as well as preventing the loss of power caused by the fluctuation in an output voltage due to the fluctuation in a load current and the flow of the load current and a discharge current through a resistor.

Next, a description will be made about two forms of the DC pulse power supply device of the invention. A first form uses one DC reactor in a step-up chopper circuit, the DC reactor being composed of a non-tapped autotransformer. A second form uses two DC reactors magnetically coupled to each other, these two DC reactors being composed of a tapped autotransformer, or of two DC reactors magnetically coupled or a multi-winding transformer.

FIGS. 1(a) to 1(e) illustrate schematic configurations of a pulsing unit and a clamp voltage unit included in the DC pulse power supply device of the invention as well as a voltage, and the first form will be described with reference to FIGS. 1(a) and 1(b) and the second form will be described with reference to FIGS. 1(c) to 1(e). FIGS. 1(a) to 1(e) show that a DC reactor is arranged on a low-voltage side of the pulsing unit.

Figure 1:
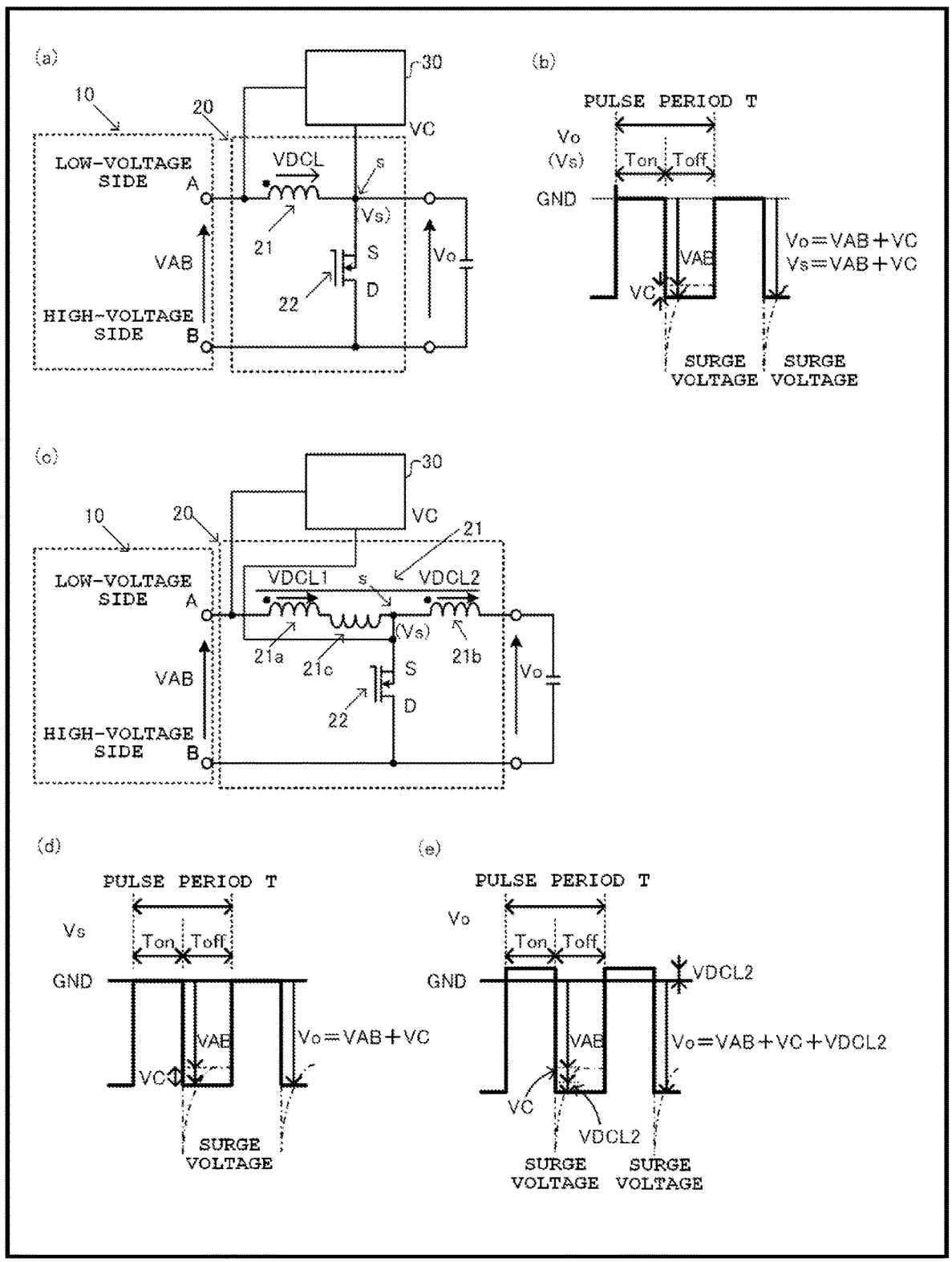
FIG. 1 illustrates a schematic configuration of a DC pulse power supply device according to the invention.

The DC pulse power supply device comprises a DC power supply unit 10, a pulsing unit 20 that generates a pulse output by a step-up chopper circuit connected to the DC power supply unit 10, and a clamp voltage unit 30. In FIG. 1, terminals on the DC power supply unit side are depicted with A and B, in which the terminal A is on a low-voltage side and the terminal B is on a high-voltage side.

(Pulsing Unit)

The pulsing unit 20 comprises a step-up chopper circuit consisting of a DC reactor 21 and a switching element 22, which are connected in series, in which the DC reactor 21 is connected in series between the DC power supply unit 10 and a load, whereas the switching element 22 is connected in parallel to the load. FIG. 1 shows the load as a capacitor connected to an output end of the pulsing unit 20.

In the pulsing unit 20, energy is accumulated in the DC reactor 21 during an ON operation of the step-up chopper circuit, and the accumulated energy produces a reactor voltage in the DC reactor 21 during an OFF operation. The reactor voltage is boosted by repeatedly turning ON and OFF the step-up chopper circuit.

FIGS. 1(a) and 1(b) show configurations in which a source S of the switching element 22 is connected to an end on the load side of the non-tapped autotransformer, and FIGS. 1(c) to 1(e) show configurations in which the source S of the switching element 22 is connected to a tap of the tapped autotransformer.

(Clamp Voltage Unit)

The clamp voltage unit 30 is circuitry for clamping a voltage across the switching element 22 to a predefined voltage, and can be configured by a regeneration unit. The regeneration unit inputs a reactor voltage VDCL of the DC reactor 21, and regenerates an excessive component (VDCL-Vin), which exceeds a regeneration input voltage Vin as a set voltage, to the DC power supply unit.

The regeneration unit does not regenerate a voltage component when the reactor voltage VDCL does not exceed the set voltage, while regenerating the voltage component exceeding the set voltage to the DC power supply unit when the voltage VDCL exceeds the set voltage. Thus, the voltage boosted in the step-up chopper circuit is clamped to the set voltage, thereby preventing the generation of the excessive voltage.

The set voltage is defined by the regeneration input voltage Vin of the regeneration unit. When the reactor voltage VDCL in the DC reactor 21 does not exceed the regeneration input voltage Vin in the regeneration unit, the regeneration unit does not regenerate the voltage, and when the reactor voltage VDCL exceeds the regeneration input voltage Vin of the regeneration unit, the unit regenerates an exceeded component (VDCL-Vin) to the DC power supply unit. The regeneration input voltage Vin in the regeneration unit, which is the set voltage for defining a regeneration operation, can be set on the basis of a DC voltage VAB of the DC power supply unit and the operation regeneration unit.

According to one configuration example, the regeneration unit comprises a capacitor connected in parallel with respect to the reactor voltage of the pulsing unit 20, an inverter circuit that performs orthogonal transformation on a capacitor voltage across the capacitor, a transformer that transforms an AC voltage of the invertor circuit, and a rectifier that rectifies an AC voltage of the transformer, the rectifier having its output end connected to the DC power supply unit.

A transformer ratio of the transformer defines a voltage ratio between the voltage across the capacitor and the voltage of the DC power supply unit. Since the capacitor voltage in the regeneration unit is defined depending on the voltage of the DC power supply unit and the transformer ratio of the transformer, the regeneration unit utilizes the capacitor voltage as the set voltage of the regeneration input voltage Vin to perform start and stop of the regeneration operation. The set voltage is dependent on the voltage of the DC power supply unit and the transformer ratio of the transformer, thereby enabling to vary the transformer ratio of the transformer to change the set voltage. The change in the set voltage can change the clamp voltage in the step-up chopper circuit while changing an operating voltage of the regeneration operation.

In the step-up chopper circuit, the DC reactor 21 is connected between the DC power supply unit and the source S of the switching element 22 of the step-up chopper circuit. The source S of the switching element 22 of the step-up chopper circuit is connected to a load-side end of the DC reactor 21 or the tap of the DC reactor 21.

(Forms of Connection between Clamp Voltage Unit (Regeneration Unit) and DC Reactor)

The connection between the clamp voltage unit 30 and the DC reactor of the pulsing unit 20 may take various forms. A first form uses the non-tapped autotransformer as DC reactor to connect the output end of the clamp voltage unit 30 to the load side of the DC reactor 21, while connecting the other end to the DC power source unit (configuration example in FIG. 1(*a*)).

A second form uses the tapped autotransformer as DC reactor to connect the output end of the clamp voltage unit 30 to a connection point s between the first DC reactor 21*a* and the second DC reactor 21*b*, while connecting the other end to the terminal A of the DC power supply unit (configuration example in FIG. 1(*c*)).

(First Form)

In the first form, as shown in FIG. 1(*a*), the source S of the switching element 22 of the step-up chopper circuit is connected to the end on the load side of the DC reactor 21, and the output end of the clamp voltage unit 30 is connected to the connection point s. The point s between the DC reactor 21 and the source S of the switching element 22 is clamped to the clamp voltage VC by the clamp voltage unit 30, and a voltage Vs at the connection point s is a voltage (VAB+VC) obtained by superimposing the clamp voltage VC on the DC voltage VAB of the DC power supply unit.

Figure 11:
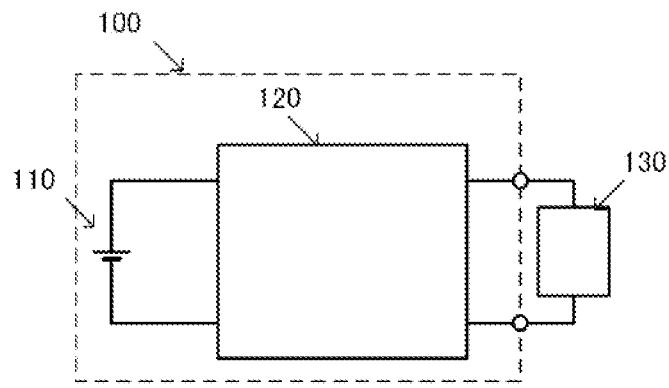
FIG. 11 illustrates configuration examples of a conventional DC pulse power supply device and a conventional step-up chopper circuit.
Figure 11:
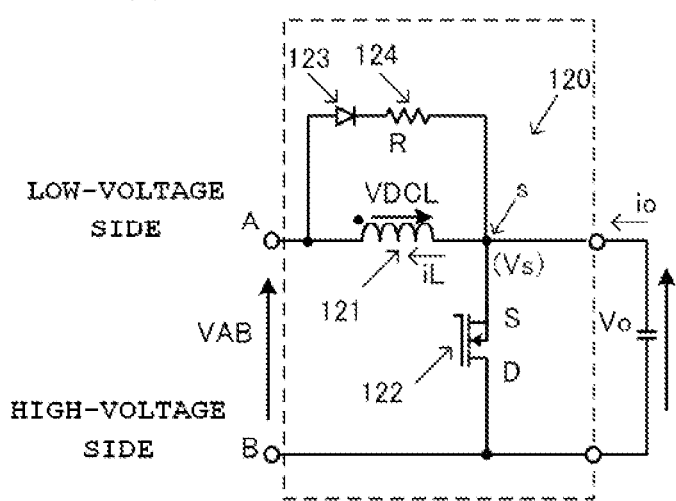
Figure 11:
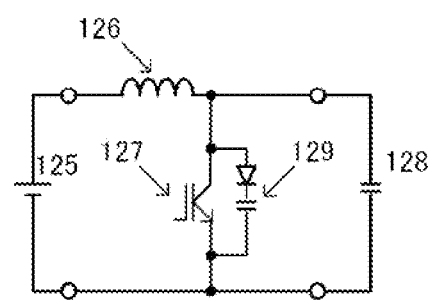
Figure 11:
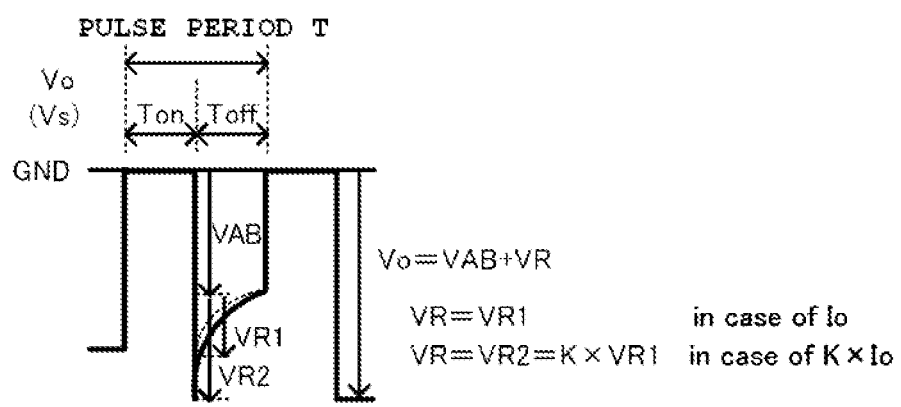

FIG. 1(*b*) shows the state of the voltage in the first form, more specifically shows the voltage Vs at the connection point s and an output voltage Vo. In the first form, a value of the voltage Vs at the connection point s is equal to that of the output voltage Vo. When the voltage is boosted by the discharge of energy accumulated in the DC reactor 21, the voltage at the connection point s is also clamped to the clamp voltage VC by the clamp voltage unit 30. Consequently, the voltage Vs and the output voltage Vo are held to (VAB+VC), thereby preventing the excessive rise in the voltage. By contrast, in the configuration shown in FIG. 11(*b*) in which the resistor R is connected in parallel to the inductance, the voltage rises rapidly at OFF point of the switching element, resulting in the generation of the surge voltage, as shown in FIG. 1(*b*) about the voltage variation indicated by a dashed-dotted line. Even though the resistor R can prevent the generation of the surge voltage with low resistivity, a voltage equivalent to the reactor voltage VDCL is applied that causes a large loss.

In the first form, if the clamp voltage unit 30 is composed of the regeneration unit, entire reactor voltage in the DC reactor 21 is input to the regeneration unit, so as to perform the regeneration operation based on the comparison with a set voltage of the regeneration unit. The regenerated voltage can be supplied to the DC power supply unit, by way of example.

(Second Form)

In the second form, as shown in FIG. 1(*c*), the DC reactor 21 comprises a series circuit consisting of the first DC reactor 21*a* and the second DC reactor 21*b* magnetically coupled to each other, in which circuit the source S of the switching element 22 of the step-up chopper circuit is connected to a tap between the first DC reactor 21*a* and the second DC reactor 21*b*, and the tap is connected as the connection point s to the output end of the clamp voltage unit 30. That is, connected to the connection point s are the tap of the DC reactor 21, the output end of the clamp voltage source, and the source S of the switching element 22 of the step-up chopper circuit.

The connection point s between the tap of the DC reactor 21 and the source S of the switching element 22 is clamped to the clamp voltage VC of the clamp voltage unit 30, and the voltage Vs at the connection point s becomes the voltage (VAB+VC) obtained by superimposing the clamp voltage VC on the DC voltage VAB in the DC power supply unit.

FIGS. 1(*d*) and 1(*e*) show the states of the voltage in the second form, FIG. 1(*d*) showing the voltage Vs at the connection point s and FIG. 1(*e*) showing the output voltage Vo. Even when the voltage is boosted by the discharge of the energy accumulated in the DC reactor 21, the voltage at the connection point s is also clamped to the clamp voltage VC of the clamp voltage unit 30. Consequently, the voltage Vs is held to (VAB+VC) and the output voltage Vo is held to (VAB+VC+VDCL2), thereby preventing the excessive rise in the voltages. By contrast, in the configuration shown in FIG. 11(*b*) in which the resistor R is connected in parallel to the inductance, the voltage rises rapidly at OFF point of the switching element, resulting in the generation of the surge voltage, as shown in FIGS. 1(*d*) and 1(*e*) about the change in the voltage indicated by a dashed-dotted line. Even though the resistor R can suppress the surge voltage with low resistivity, a voltage equivalent to the reactor voltage VDCL is applied that causes a large loss.

In the second form, if the clamp voltage unit 30 is composed of the regeneration unit, a voltage across the first DC reactor 21*a* of the DC reactor 21 is input as the reactor voltage to the regeneration unit, so that the regeneration operation is performed based on the comparison with the set voltage of the regeneration unit. The regenerated voltage can be supplied to the DC power supply unit, for instance.

In the second form, in order to suppress the surge voltage to the switching element, it is desirable that the clamp voltage unit 30 is connected at a middle point that is the connection point between the DC reactor 21 and the switching element 22.

In the configuration that the output end of the clamp voltage unit 30 is connected to the connection point between the DC reactor 21 and the switching element 22, when the DC reactor 21 is composed of the first DC reactor 21*a* and the second DC reactor 21*b*, the output end of the clamp voltage unit 30 is connected to the connection point between the first DC reactor 21*a* and the second DC reactor 21*b*.

For the magnetically coupled first DC reactor 21*a* and second DC reactor 21*b*, an ideal coupling coefficient is 1, but a practical coupling coefficient is smaller than 1. This is due to an influence of flux leakage, and the flux leakage is a leakage inductance 21c connected in series to the first DC reactor 21a and the second DC reactor 21b. In the above configuration, the clamp voltage unit 30 is connected such that the surge voltage generated by the leakage inductance 21c is suppressed.

Figure 2:
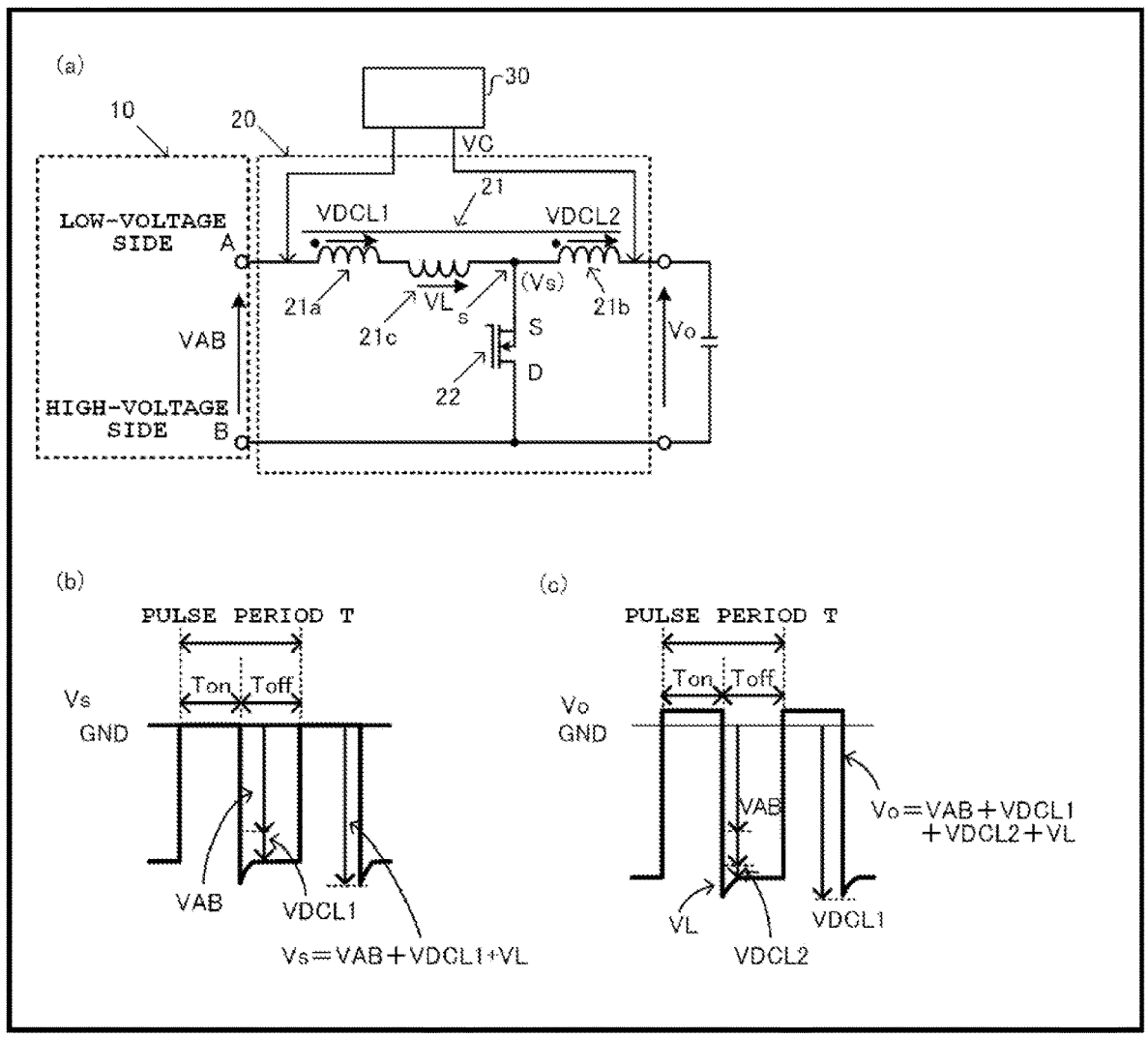
FIG. 2 illustrates a schematic configuration of the DC pulse power supply device according to the invention.

Next, a description will be made about the relationship between a connection position of the clamp voltage unit 30 and the DC reactor 21 and the surge voltage by referring to FIG. 2.

FIGS. 2(a) to 2(c) show a case where one of the output ends of the clamp voltage unit 30 is connected to the DC power supply unit, whereas the other end is connected to the load of the second DC reactor 21b.

In this configuration example, the voltage Vs at the end of the source S of the switching element 22 is not clamped to the clamp voltage VC of the clamp voltage unit 30. A voltage generated in the first DC reactor 21a is the voltage VDCL1. The surge voltage produced by the leakage inductance 21c is a voltage VL. That is to say, as the voltage Vs, a voltage of VDCL1+VL is generated. As shown in FIG. 2(b), the voltage Vs is expressed by Vs=VAB+VDCL1+VL and includes the surge voltage VL, so that the voltage Vs is affected by the surge voltage.

Furthermore, the output voltage Vo becomes Vo=VAB+VDCL1+VDCL2+VL. As the component (VDCL1+VDCL2+VL) included in the output voltage Vo is obtained by adding the component (VDCL1) by an inductance of the first DC reactor 21a, the component (VDCL2) by an inductance of the second DC reactor 21b and the surge voltage (VL) by a leakage inductance of the leakage inductance 21c, the output voltage Vo is affected by the surge voltage.

As described above, in order to prevent the generation of the surge voltage VL, the output end of the clamp voltage unit 30 is connected to the connection point between the first DC reactor 21a and the second DC reactor 21b.

A description will now be made about the DC power supply device of the present invention by referring to first to fifth configuration examples and FIGS. 3 to 10. The first to fifth configuration examples respectively exemplify the clamp voltage unit 30 consisting of a regeneration unit 30A.

The first configuration example is for regenerating the reactor voltage across the DC reactor of the step-up chopper circuit, and the second to fifth configuration examples are for regenerating the reactor voltage of one of two magnetically coupled DC reactors of the step-up chopper circuit. The second and fifth configuration examples use a tapped auto-transformer as magnetically coupled two DC reactors, and the third and fourth configuration examples use a multi-winding transformer as magnetically coupled two DC reactors.

Furthermore, in regard to the reactor voltage to be regenerated, the first to fifth configuration examples use the voltage on the low-voltage side in the DC power supply unit as reference voltage.

(First Configuration Example of DC Pulse Power Supply Device)

A description will be made about the first configuration example of the DC pulse power supply device of the invention and a state of the voltage by referring to FIGS. 3, 4 and 5.

The DC pulse power supply device of the invention comprises the DC power supply unit (DC unit) 10, a pulsing unit 20A that supplies to the load 4 with a pulse output generated by the step-up chopper circuit connected to the DC power supply unit 10, a regeneration unit 30A as clamp voltage unit that regenerates an excessively-risen component of a voltage produced in the pulsing unit 20A to the DC power supply unit 10 so as to clamp high limit voltages at an end of the source of the switching element and at an output end of the DC pulse power supply device to the clamp voltage, in which device the pulse output is supplied to the load 4 through an output cable 3. The control unit 40 controls the DC power supply unit 10, the pulsing unit 20A and the regeneration unit 30A. FIG. 3 shows an example for using a plasma generation device as the load 4, but the load 4 is not limited thereto and thus an excitation of a pulse laser, electrical discharge machine or similar may be employed.

(DC Power Supply Unit)

The DC power supply unit (DC unit) 10 comprises a rectifier 11 that rectifies an AC voltage of an AC power supply 2 into a DC voltage, a snubber circuit 12 that absorbs and suppresses a high voltage spike transiently generated during rectification, a single-phase inverter circuit 13 that changes the DC voltage into an AC voltage, a single-phase transformer 14 that transforms the AC voltage in the single-phase inverter circuit 13 to a prescribed voltage value, a rectifier 15 that rectifies the AC voltage transformed by the single-phase transformer 14 to a DC voltage, and a capacitor (CF) 16 that stores a both-end voltage as a DC voltage of the DC power supply unit. One end of the capacitor 16 is grounded, and a negative low-voltage is produced at the other end thereof. The configuration in FIG. 3 shows a capacitive load of the plasma generation device as an example of the load 4. In this configuration, as one end of the plasma generation device is grounded to supply the negative voltage, the DC power supply unit 10 is configured to generate a puled output of the negative voltage.

The single-phase inverter circuit 13 performs a switching operation in response to a control signal sent from the control circuit 40, so as to change the DC voltage into an AC voltage with a predefined frequency. Each circuit element of the rectifiers 11, 15, the snubber circuit 12, the single-phase inverter circuit 13 and the single-phase transformer 14, which compose the DC power supply unit 10, may be any circuitry that is commonly known.

(Pulsing Unit)

The pulsing unit 20A creates a pulse waveform from the DC voltage by the step-up chopper circuit. The step-up chopper circuit comprises a DC reactor 21A connected in series between the DC power supply unit and the load, a switching element (Q1) 22 connected in parallel to the load, and a drive circuit 23 for controlling an ON/OFF operation of the switching element 22. The pulsing unit 20A is provided on its DC power supply unit side with a grounded terminal B and a terminal A of negative voltage as low-voltage side. The illustrated switching element 22 is an example of FET, in which the source S is connected to the low-voltage side and a drain D is connected to a grounded-voltage side, thereby inputting a drive signal from the drive circuit 23 to a gate G.

The control circuit 40 produces a signal for setting a time width or duty ratio between an ON period and an OFF period of the switching element 22 with respect to a target pulse output in order to activate the step-up chopper circuit, as well as producing a control signal based on a voltage and current at the output end of the DC power supply unit 10.

The drive circuit 23 outputs the drive signal based on the control signal from the control circuit 40 to the gate G of the switching element 22, thereby making the switching element 22 to perform the ON/OFF operation.

The source S of the switching element 22 is connected to the load side of the DC reactor 21A, and the drain D of the switching element 22 is grounded. When the switching element 22 is ON, the load side of the DC reactor 21A is grounded, and thereby a current flows from the terminal B to the terminal A through the switching element 22 in the ON state and the DC reactor 21A. At this time, electromagnetic energy is accumulated in the DC reactor 21A. Then, when the switching element 22 is turned from the ON state to the OFF state, a reactor voltage VDCL is generated in the DC reactor 21A by the accumulated energy in the DC reactor 21A. By repeating the ON and OFF operation of the switching element 22, the step-up chopper circuit can boost the output voltage Vo according to the duty ratio of the ON and OFF periods.

(Clamp Voltage Unit: Regeneration Unit)

The regeneration unit 30A regenerates to the DC power supply unit a component of the reactor voltage in the DC reactor of the step-up chopper circuit that exceeds the set voltage. The regeneration unit 30A comprises a diode 31, a capacitor (C1) 32, an inverter circuit 33, a transformer 34 and a rectifier 35. As the regeneration unit 30A regenerates to the DC power supply unit the component exceeding the set voltage when the reactor voltage exceeds the set voltage, the regeneration unit 30A acts as the clamp voltage unit for clamping the reactor voltage to a capacitor voltage VC1 in the capacitor (C1) 32. At this time, the clamp voltage of the clamp voltage unit is defined based on the capacitor voltage VC1. The regeneration unit 30A, or clamp voltage unit 30, clamps high limit voltages at the source end of the switching element 22 and the output end of the DC pulse power supply unit to the capacitor voltage VC1 so as to prevent the excessive voltage from being applied to a drain-source voltage VDS in the switching element 22, thereby preventing the output voltage from fluctuating due to the fluctuation in a load current.

One end of the capacitor (C1) 32 is connected to an end of the load of the DC reactor 21A, and the other end is connected to an end of the DC power supply unit of the DC reactor 21A via the diode 31, so that the reactor voltage generated in the first DC reactor 21a is applied. The capacitor voltage VC1 of the capacitor (C1) 32 is defined on the basis of a DC voltage VAB of the DC power supply unit, and when a transformer ratio of the transformer 34 is (n2:n1), the set voltage is VC1=(n2/n1)×VAB. The diode 31 is connected in such a way that a direction from the pulsing unit 20A toward the capacitor (C1) 32 of the regeneration unit 30A is a forward direction, and when the reactor voltage VDCL of the DC reactor 21A exceeds the capacitor voltage VC1 of the capacitor (C1) 32, the regeneration unit 30A regenerates a component of the reactor voltage VDCL that exceeds the capacitor voltage VC1 of the capacitor (C1) 32. Thus, the regeneration unit 30A performs the regeneration operation by using the capacitor voltage VC1 of the capacitor (C1) 32 as threshold. The capacitor voltage VC1 corresponds to the regeneration input voltage Vin in FIG. 1.

As to a method for defining the capacitor voltage VC1, there is a solution to vary the transformer ratio of the transformer 34 as well as controlling the output of the inverter circuit 33. Such solution can be, for example, PWM control or phase-shift control, but is not limited thereto and any solution that controls the output of the inverter circuit may be adopted.

Figure 3:
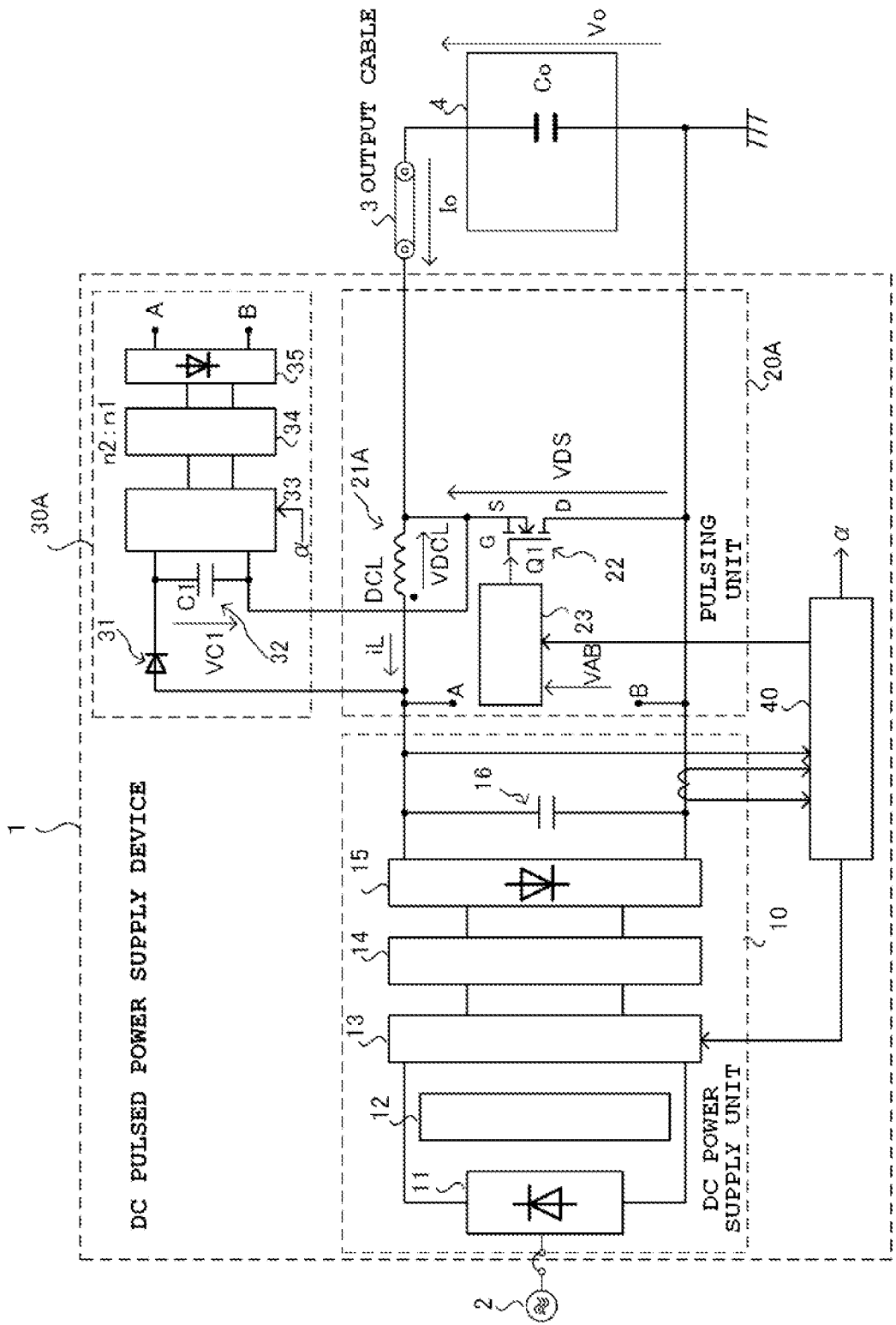
FIG. 3 illustrates a first configuration example of the DC pulse power supply device according to the invention.

Furthermore, in the circuitry shown in FIG. 3, the regeneration unit 30A is configured such that one end of the regeneration unit is connected to a low-voltage input end of the pulsing unit 20A, so as to regenerate the reactor voltage VDCL of the DC reactor 21a as the regeneration input voltage Vin based on a voltage on the low-voltage side (negative voltage).

The inverter circuit 33 performs orthogonal transformation between the DC voltage in the capacitor 32 and the AC voltage in the transformer 34 to thereby hold the capacitor voltage VC1 of the capacitor (C1) 32 to a constant voltage level based on the DC voltage VAB of the DC power supply unit, and when the reactor voltage VDCL exceeds the capacitor voltage VC1 of the capacitor (C1) 32, change the exceeded voltage component into an AC voltage to regenerate it to the DC power supply unit. Since the capacitor voltage VC1 is held to the constant voltage level, the reactor voltage VDCL in the DC reactor 21A is clamped to the capacitor voltage VC1. The inverter circuit 33 can be configured with a bridge circuit of the switching element, by way of example. The switching element is open and closed by the control in response to a control signal α from the control circuit 40.

The transformer 34 modulates a voltage ratio between the DC voltage VAB of the DC power supply unit 10 and the capacitor voltage VC1 of the capacitor (C1) 32 based on the transformer ratio. When the transformer ratio of the transformer 34 is (n2:n1), the relationship of the voltages between the DC voltage VAB and the capacitor voltage VC1 can be expressed by VC1=(n2/n1)×VAB.

The rectifier 35 rectifies the AC voltage in the transformer 34 to the DC voltage in the DC power supply unit 10. The terminal on the DC side of the rectifier 35 is connected to the terminals A, B of the DC power supply unit 10, so that electric power is regenerated to the DC power supply unit 10 only when the capacitor voltage VC1 exceeds a voltage based on the DC voltage VAB.

The configuration of the regeneration unit 30A is not limited to the above-described one if the configuration includes a function of clamping the voltage across the DC reactor 21A to a predefined voltage and a function of regenerating a component of electric power exceeding the predefined voltage to the DC power supply unit.

(States of Voltage in DC Pulse Power Supply Device)

The states of the voltage of the DC pulse power supply device will be described by referring to FIGS. 4 and 5. In FIG. 4, FIG. 4(a) shows an ON state and an OFF state of the switching element (Q1) 22, FIG. 4(b) shows the reactor voltage VDCL of the DC reactor 21A, FIG. 4(c) shows a drain-source voltage VDS of the switching element 22, and FIG. 4(d) shows the output voltage Vo.

In the following, referential numerals S1 to S14 represent the ON state and the OFF state in each phase. The odd numerals S1, S3 . . . S13 represent the ON state of the switching element 22, and the even numerals S2, S4 . . . S14 represent the OFF state of the switching element 22.

(i) ON State (S1, S3 . . . S13)

The switching element 22 is in the ON state (FIG. 4(a)), in which state the terminal on the negative side of the DC reactor 21A is grounded, so that the drain-source voltage VDS in the switching element 22 stands at zero (FIG. 4(c)) and the reactor voltage VDCL in the DC reactor 21A becomes the DC voltage VAB of the DC power supply unit (FIG. 4(b)). Furthermore, the output voltage Vo is 0V (FIG. 4(d)).

(ii) OFF State (S2, S4 . . . S14)

Concerning the OFF state, a description will be made about the reactor voltage VDCL in a state before reaching the capacitor voltage VC1 as a threshold for regeneration (S2, S4, S6) and a state after reaching the capacitor voltage VC1 (S8, S10, S12, S14).

Figure 4:
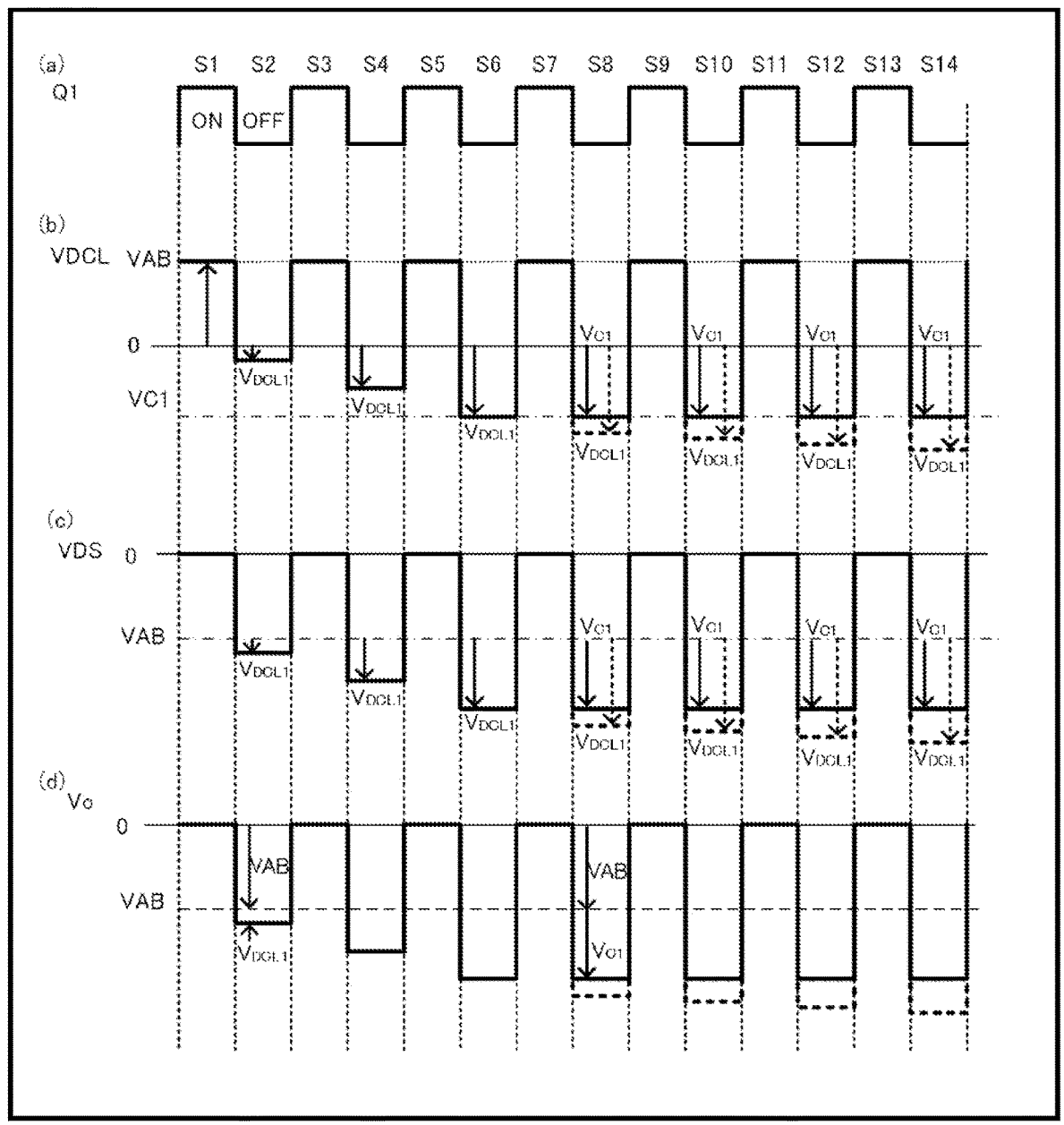
FIG. 4 illustrates a state of a voltage in the first configuration example of the DC pulse power supply device according to the invention.
Figure 5:
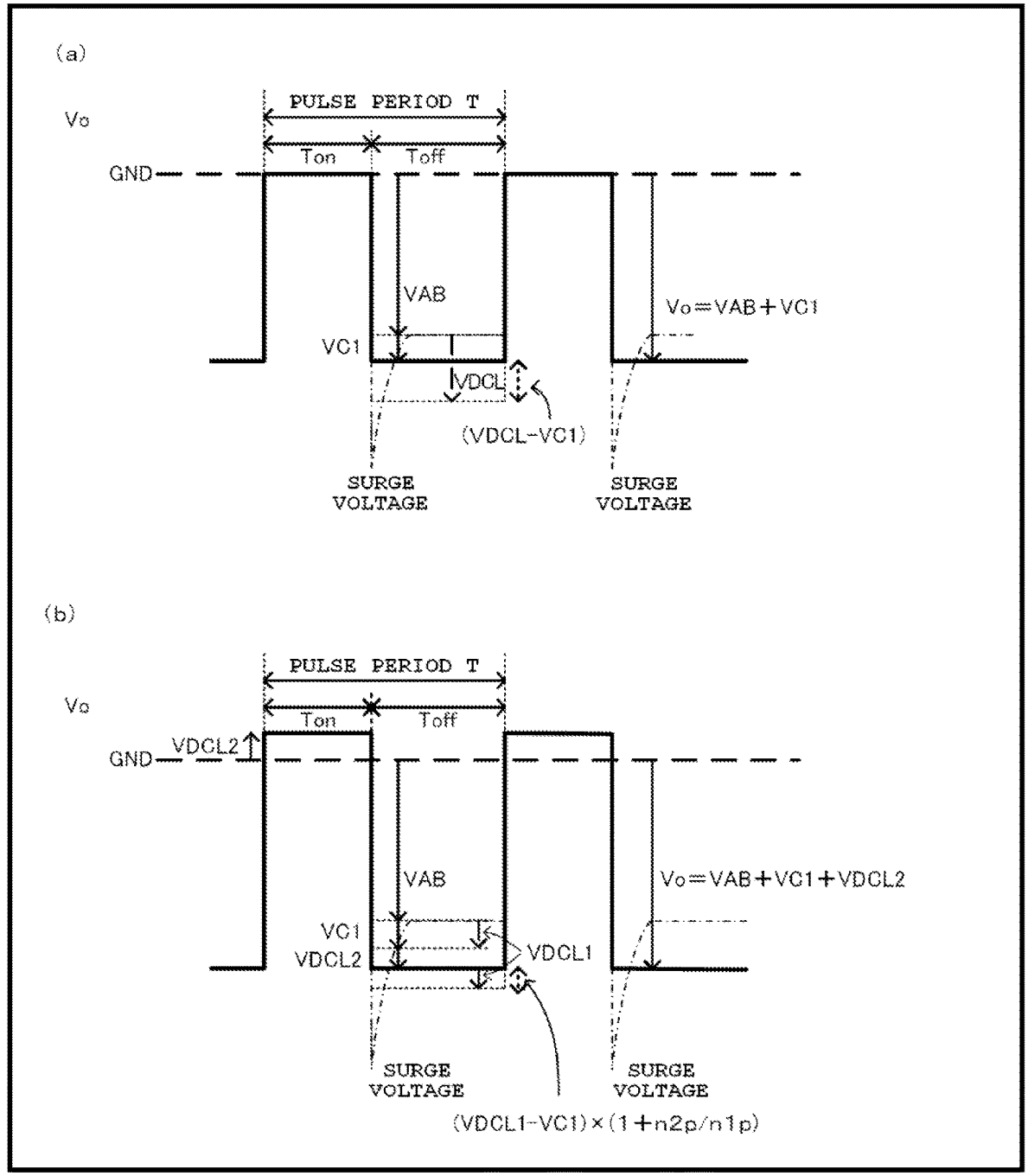
FIG. 5 illustrates an output voltage Vo of the DC pulse power supply device according to the invention.

(ii-1) States of S2, S4, S6 The switching element 22 is in the OFF state (FIG. 4(a)), and the reactor voltage VDCL is generated in the DC reactor 21A by the discharge of the accumulated energy. The voltage value of the reactor voltage VDCL increases every time the state changes from ON state to OFF state. In this voltage rise, the reactor voltage VDCL does not reach the capacitor voltage VC1 of the regeneration unit, so that no regeneration is performed. FIG. 4 shows a state where the voltage value on the negative side increases (FIG. 4(b)).

The drain-source voltage VDS of the switching element 22 is rendered to be a voltage corresponding to the reactor voltage VDCL and increases gradually, but does not reach the capacitor voltage VC1 of the regeneration unit. In here, FIG. 4 shows a state where the voltage value on the negative side increases (FIG. 4(c)). As the output voltage Vo, output is a voltage obtained by adding the reactor voltage VDCL to the DC voltage VAB of the DC power supply unit (FIG. 4(d)).

(ii-2) States of S8, S10, S12, S14

As with the cases of S2, S4, S6, the switching element 22 is in the OFF state (FIG. 4(a)), and the reactor voltage VDCL is generated in the DC reactor 21A by the discharge of the accumulated energy. In the states of S8, S10, S12 and S14, the voltage value of the reactor voltage VDCL reaches the capacitor voltage VC1, so that the voltage value of the reactor voltage VDCL is clamped to the capacitor voltage VC1 to prevent the voltage from rising any further. FIG. 4(b) shows a state where the reactor voltage VDCL depicted with a solid line is clamped to the capacitor voltage VC1, and also a case, as a comparative example, where the reactor voltage VDCL depicted with a broken line is not clamped to the capacitor voltage VC1.

The drain-source voltage VDS of the switching element 22 is rendered to be a voltage corresponding to the reactor voltage VDCL, and is held to the voltage of the capacitor voltage VC1 of the regeneration unit. FIG. 4(c) shows a state where the drain-source voltage VDS depicted with a solid line is clamped to the capacitor voltage VC1, and also a case, as a comparative example, where the drain-source voltage VDS depicted with a broken line is not clamped to the capacitor voltage VC1. In here, FIG. 4 shows a state where the voltage value on the negative side increases (FIG. 4(c)).

As the output voltage Vo, output is a voltage obtained by adding the reactor voltage VDCL to the DC voltage VAB of the DC power supply unit. Since the reactor voltage VDCL is clamped, the output voltage Vo is held to be constant (FIG. 4(d)).

FIG. 5(a) shows the first configuration example, in which the output voltage Vo is in a state of regeneration. The DC pulse power supply device outputs a pulse output of the output voltage Vo with a period of switching the step-up chopper circuit as a pulse period T. The pulse output has, during the pulse period T, an ON period Ton in which the switching element is in the ON state and an OFF period Toff in which the switching element is in the OFF state. The value of the output voltage Vo during the ON period Ton corresponds to the drain-source voltage VDS.

By contrast, the output voltage Vo during the OFF period Toff is obtained by superimposing the reactor voltage VDCL on the DC voltage VAB of the DC power supply unit, namely (VAB+VDCL). However, since the reactor voltage VDCL is clamped to the capacitor voltage VC1, the output voltage stands at (VAB+VC1). As the DC voltage VAB and the capacitor voltage VC1 are held constant, the output voltage Vo of the pulse output is held constant. In FIG. 5(a), the parts indicated by a dashed line represent voltages (VDCL-VC1) suppressed by deducting the clamped capacitor voltage VC1 from the reactor voltage VDCL. By contrast, in the configuration shown in FIG. 11(b) in which a resistor R is connected in parallel to the inductance, the voltage rises rapidly at OFF point of the switching element, resulting in the generation of the surge voltage, as shown in FIG. 5(a) about the change in the voltage indicated by a dashed-dotted line.

(Configuration Example of Regeneration Unit)

Figure 6:
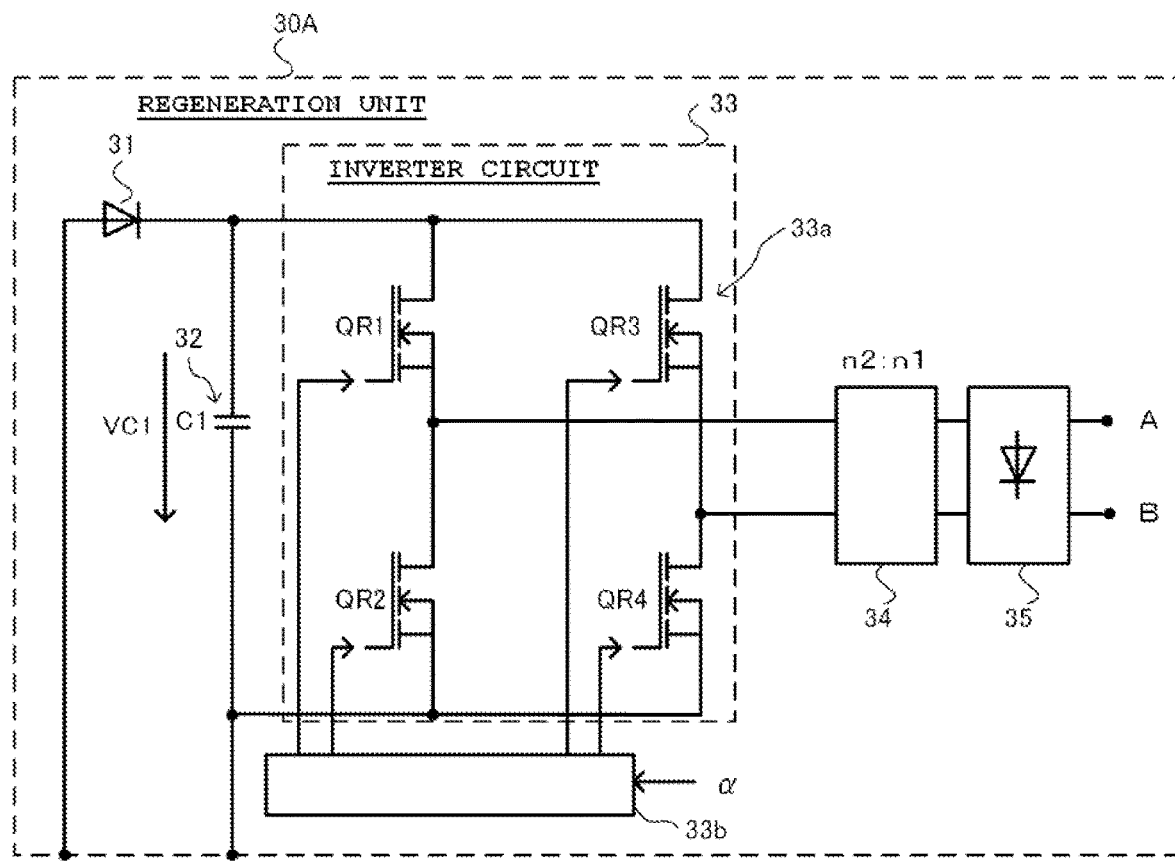
FIG. 6 illustrates a configuration example of a regeneration unit of the DC pulse power supply device according to the invention.

Referring to FIG. 6, a description will be made about an example of the circuitry of the inverter circuit included in the regeneration unit of the DC pulse power supply device.

The regeneration unit 30A includes the inverter circuit 33 that supplies to the transformer 34 with an AC voltage obtained by performing orthogonal transformation on the DC voltage of the capacitor voltage VC1 in the capacitor (C1) 32. The inverter circuit 33 comprises a bridge circuit 33a consisting of switching elements QR1 to QR4, and a drive circuit 33b that produces a drive signal for driving the switching elements QR1 to QR4 based on a control signal α. In here, a full-bridge circuit is used as an example of the bridge circuit 33a, but the circuit 33a may be a half-bridge circuit or a multi-phase inverter circuit.

(Second Configuration of DC Pulse Power Supply Device)

A second configuration of the DC pulse power supply device of the present invention comprises, as with the first configuration, the DC power supply unit (DC unit) 10, a pulsing unit 20B that supplies to the load 4 with a pulse output generated by the step-up chopper circuit connected to the DC power supply unit 10, the regeneration unit 30A that regenerates a component of a voltage that rises excessively in the pulsing unit 20B to the DC power supply unit 10, and the control circuit 40 that controls the DC power supply unit 10, the pulsing unit 20b and the regeneration unit 30A, the power supply device supplying the pulse output through the output cable 3 to the load 4.

Figure 7:
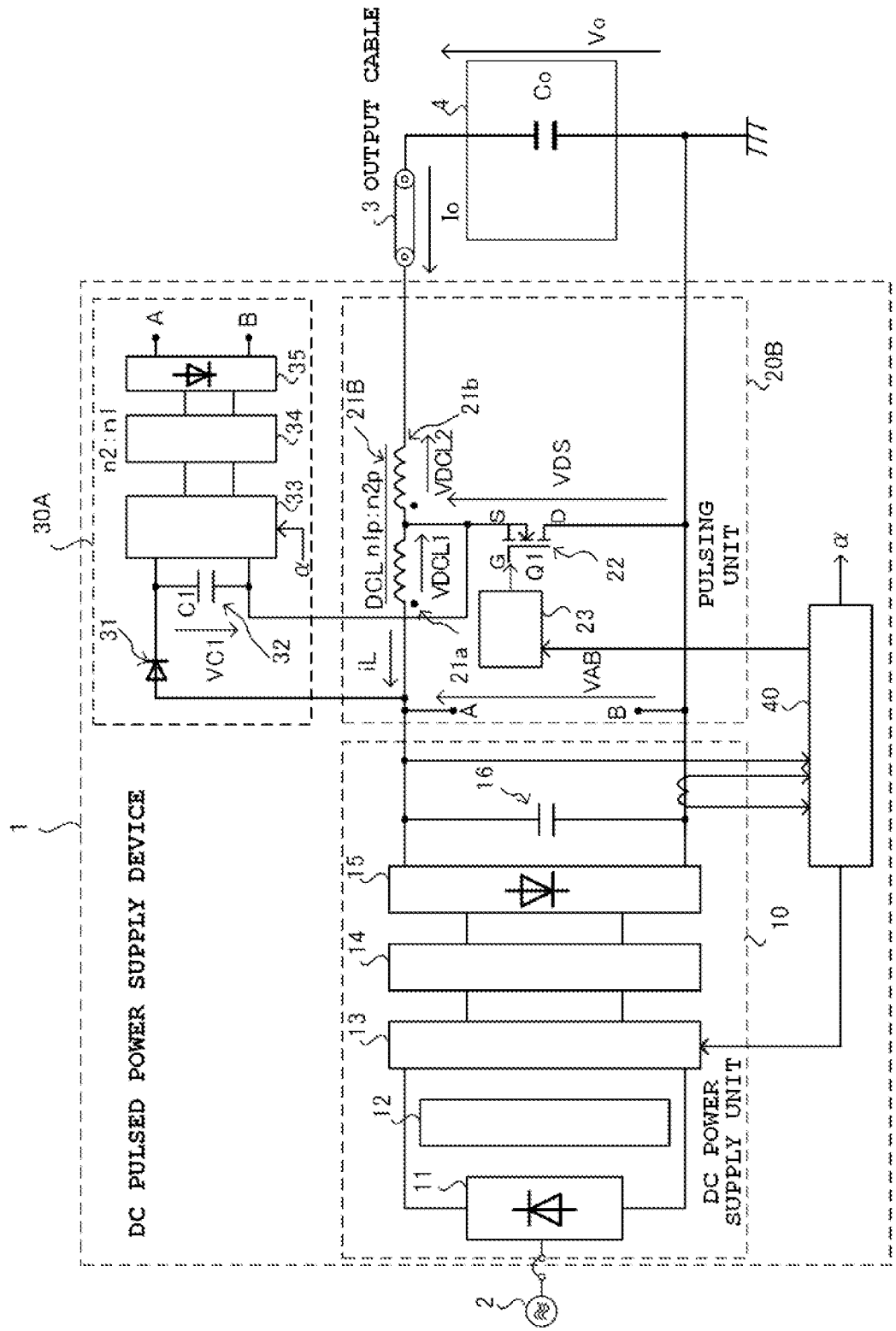
FIG. 7 illustrates a second configuration example of the DC pulse power supply device according to the invention.

The second configuration example of the DC pulse power supply device of the invention will be described by referring to FIG. 7. The second configuration example is different from the first configuration example in the step-up chopper circuit in the pulsing unit 20, and is the same as the first configuration example in the other constituent elements. Next, a description will be made about the constituent element that differs from that of the first configuration example, and the description about the other common elements will be omitted.

The DC reactor 21A included in the step-up chopper circuit of the first configuration example is composed of a single coil. By contrast, the DC reactor 21B of the second configuration example is composed of a tapped autotransformer, instead of the single coil of the step-up chopper circuit of the first configuration example. The DC reactor 21B of the tapped autotransformer can be configured by connecting the magnetically coupled first DC reactor 21a and second DC reactor 21b in series, and a connection point between the first DC reactor 21a and the second DC reactor 21b is used as a tapping point. One end of the first DC reactor 21a is connected to the terminal A on the low-voltage side of the DC power supply unit, whereas one end of the second DC reactor 21b is connected to the load side, and the tapping point of the connection point between the first DC reactor 21a and the second DC reactor 21b is connected to the source S of the switching element 22.

When the switching element 22 is in the ON state, the tapping point of the connection point of the DC reactor 21B is grounded, thereby flowing a current from the terminal B to the terminal A via the switching element 22 in the ON state and the first DC reactor 21a of the DC reactor 21B. At this time, electromagnetic energy is accumulated in the first DC reactor 21a.

Then, when the switching element 22 is turned from the ON state to the OFF state, a reactor current iL flown by the accumulated energy in the first DC reactor 21a of the DC reactor 21B causes the generation of a reactor voltage VDCL1 in the first DC reactor 21a and a reactor voltage VDCL2 in the second DC reactor 21b. The step-up chopper circuit repeatedly changes the ON state and the OFF state of the switching element 22, so as to boost the output voltage Vo as with the case of the first configuration example.

The voltage ratio between the reactor voltage VDCL1 of the first DC reactor 21a and the reactor voltage VDCL2 of the second DC reactor 21b corresponds to an inductance ratio between the first DC reactor 21a and the second DC reactor 21b. When a turns ratio of the tapped single-turning coils of the first DC reactor 21a and second DC reactor 21b of the DC reactor 21B is n1p:n2p, the voltage ratio (VDCL1/VDCL2) between the reactor voltage VDCL1 of the first DC reactor 21a and the reactor voltage VDCL2 of the second DC reactor 21b stands at the turns ratio of (n1p/n2p).

The regeneration unit 30A in the second configuration example works in the same way as that of the first configuration example by applying the reactor voltage VDCL1 of the first DC reactor 21a of the DC reactor 21B, instead of the reactor voltage VDCL of the DC reactor 21A in the first configuration example. The regeneration unit 30A acts as the clamp voltage unit that regenerates a component of the reactor voltage exceeding the set voltage to the DC power supply unit when the rector voltage exceeds a set voltage, so as to clamp the reactor voltage to the capacitor voltage VC1 of the capacitor (C1) 32. At this time, the clamp voltage in the clamp voltage unit is defined depending on the capacitor voltage VC1. The regeneration unit 30A, or clamp voltage unit 30, clamps high limit voltages at the source end of the switching element 22 and at the output end of the DC pulse power supply device to the clamp voltage VC1 so as to prevent the excessive voltage from being applied to the drain-source voltage VDS in the switching element 22, thereby preventing the output voltage from fluctuating due to the fluctuation in the load current.

In the regeneration unit 30A, one end of the capacitor (C1) 32 is connected to the connection point between the first DC reactor 21a and the second DC reactor 21b of the DC reactor 21B, whereas the other end thereof is connected to the end part of the DC power supply unit in the first DC reactor 21a via the diode 31, thereby applying the reactor voltage VDCL1 generated in the first DC reactor 21a. The voltage VC1 of the capacitor (C1) 32 is defined on the basis of the DC voltage VAB of the DC power supply unit and the transformer ratio of the transformer 34, and when the transformer ratio of the transformer 34 is (n2:n1), the voltage VC1 is a set voltage of VC1=(n2/n1)×VAB. The diode 31 is connected such that a direction from the pulsing unit 20B toward the capacitor (C1) 32 of the regeneration unit 30A is a forward direction, and when the reactor voltage VDCL1 in the first DC reactor 21a exceeds the capacitor voltage VC1 in the capacitor (C1) 32, the regeneration unit 30A regenerates a component of the reactor voltage VDCL1 that exceeds the capacitor voltage VC1 of the capacitor (C1) 32. In this way, the regeneration unit 30A performs the regeneration operation by using the capacitor voltage VC1 in the capacitor (C1) 32 as threshold, as with the case of the first configuration example.

As the output voltage Vo, output is a voltage (Vo=VAB+VDCL1+VDCL2) obtained by superimposing the reactor voltage VDCL1 of the first DC reactor B and the reactor voltage VDCL2 of the second DC reactor 21b on the DC voltage VAB of the DC power supply unit. Since the reactor voltage VDCL1 of the first DC reactor 21a is clamped to the capacitor voltage VC1, the output voltage Vo stands at Vo=VAB+VC1+VDCL2.

FIG. 5(b) shows the output voltage Vo in the state of regeneration in the second configuration example. The DC pulse power supply device outputs the pulse output of the output voltage Vo with a period of switching the step-up chopper circuit as a pulse period T. The pulse output has, during the pulse period T, an ON period Ton in which the switching element is in the ON state and an OFF period Toff in which the switching element is in the OFF state. The value of the output voltage Vo during the ON period Ton corresponds to the reactor voltage VDCL2.

By contrast, the output voltage Vo during the OFF period Toff is obtained by superimposing the reactor voltage VDCL1 of the first DC reactor 21a and the reactor voltage VDCL2 of the second DC reactor 21b on the DC voltage VAB of the DC power supply unit, namely (VAB+VDCL1+VDCL2). However, the reactor voltage VDCL1 is clamped to the capacitor voltage VC1, so that the output voltage Vo stands at (VAB+VC1+VDCL2). Since the DC voltage VAB and the capacitor voltage VC1 are constant, the output voltage Vo of the pulse output is held nearly constant.

In FIG. 5(b), the parts indicated by a dashed line represent suppressed voltages. Since the regenerated capacitor voltage VC1 is clamped, the voltage VDCL1 to be applied to the source of the switching element changes into the voltage VC1, and thereby a voltage of (VDCL1−VC1) is suppressed. Furthermore, since the reactor voltage VDCL1 is suppressed, the reactor voltage VDCL2 generated in the second DC reactor 21b is also suppressed to (VDCL1−VC1)×(n2p/n1p) according to a turns ratio. Thus, a clamped component of the output voltage is (VDCL1−VC1)×(1+n2p/n1p). By contrast, in the configuration shown in FIG. 11(b) in which the resistor R is connected in parallel to the inductance, the voltage rises rapidly at OFF point of the switching element, resulting in the generation of the surge voltage, as shown in FIG. 5(b) about the change in the voltage indicated by a dashed-dotted line.

(Third Configuration of DC Pulse Power Supply Device)

A third configuration of the DC pulse power supply device of the present invention also comprises, as with the first and second configurations, the DC power supply unit (DC unit) 10, a pulsing unit 20C that supplies to the load 4 with a pulse output generated by the step-up chopper circuit connected to the DC power supply unit 10, the regeneration unit 30A that regenerates a component of a voltage that rises excessively in the pulsing unit 20C to the DC power supply unit 10, and the control circuit 40 that controls the DC power supply unit 10, the pulsing unit 20C and the regeneration unit 30A, the power supply device supplying the pulse output through the output cable 3 to the load 4.

Figure 8:
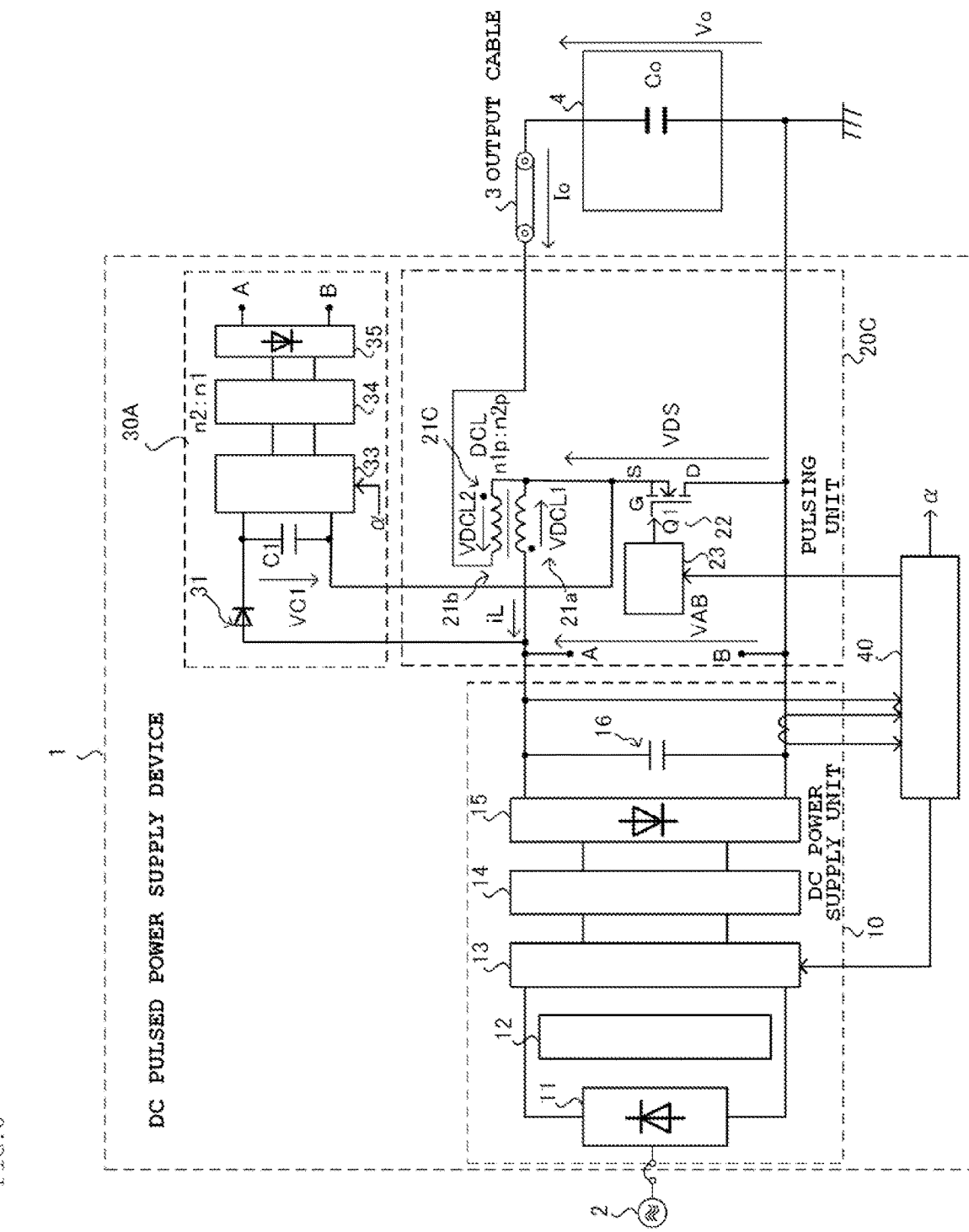
FIG. 8 illustrates a third configuration example of the DC pulse power supply device according to the invention.

A description will now be made about the third configuration example of the DC pulse power supply device of the invention by referring to FIG. 8. The third configuration example is different from the first and second configuration examples in the step-up chopper circuit in the pulsing unit 20C, and is the same as the first and second configuration examples in the other constituent elements. Next, a description will be made about the constituent element that differs from those of the first and second configuration examples, and the description about the other common elements will be omitted.

The DC reactor 21B included in the step-up chopper circuit of the second configuration example is composed of a tapped autotransformer. By contrast, the DC reactor 21C of the third configuration example is composed of a multi-winding transformer, instead of the tapped autotransformer of the step-up chopper circuit of the second configuration example. The multi-winding transformer of the DC reactor 21C is an example of an additive polarity transformer.

The DC reactor 21C consisting of the multi-winding transformer is configured by connecting the magnetically coupled first DC reactor 21a and second DC reactor 21b in parallel. One end of the first DC reactor 21a is connected to the terminal A on the low-voltage side of the DC power supply unit, and the other end thereof is connected to the end of the source S of the switching element 22. One end of the second DC reactor 21b is connected to the end of the source S of the switching element 22, and the other end is connected to the load side.

When the switching element 22 is in the ON state, the end of the switching element 22 of the first DC reactor 21a of the DC reactor 21C is grounded, so that a current flows from the terminal B to the terminal A through the switching element 22 in the ON state and the first DC reactor 21a. At this time, electromagnetic energy is accumulated in the first DC reactor 21a.

Then, when the switching element 22 is turned from the ON state to the OFF state, a reactor current iL flown by the accumulated energy in the first DC reactor 21a of the DC reactor 21C causes the generation of the reactor voltage VDCL1 in the first DC reactor 21a, and the electromagnetic coupling of the second DC reactor 21b with the first DC reactor 21a causes the generation of the reactor voltage VDCL2 in the second DC reactor 21b. The step-up chopper circuit repeatedly changes the ON state and the OFF state of the switching element 22, so as to boost the output voltage Vo as with the case of the first and second configuration examples.

A voltage ratio between the reactor voltage VDCL1 of the first DC reactor 21a and the reactor voltage VDCL2 of the second DC reactor 21b stands at a value corresponding to an inductance ratio between the first DC reactor 21a and the second DC reactor 21b. When a turns ratio of the multi-turning coils of the first DC reactor 21a and second DC reactor 21b of the DC reactor 21C is (n1p:n2p), the voltage ratio (VDCL1/VDCL2) between the reactor voltage VDCL1 of the first DC reactor 21a and the reactor voltage VDCL2 of the second DC reactor 21b stands at the turns ratio of (n1p/n2p).

The regeneration unit 30A of the third configuration example acts in the way similar to the regeneration unit for the reactor voltage VDCL1 of the first DC reactor 21a of the DC reactor 21B of the second configuration example. The regeneration unit 30A regenerates a component of the reactor voltage that exceeds the set voltage to the DC power supply unit when the reactor voltage exceeds the set voltage, so that the regeneration unit 30A can work as the clamp voltage unit for clamping the reactor voltage to the capacitor voltage VC1 of the capacitor (C1) 32. At this time, the clamp voltage of the clamp voltage unit is defined by the capacitor voltage VC1. The regeneration unit 30A, or clamp voltage unit 30, clamps high limit voltages at the source end of the switching element 22 and at the output end of the DC pulse power supply device to the capacitor voltage VC1 so as to prevent the excessive voltage from being applied to the drain-source voltage VDS in the switching element 22, thereby preventing the output voltage from changing due to the change in a load current.

In the regeneration unit 30A, one end of the capacitor (C1) 32 is connected to an end of the switching element of the first DC reactor 21a of the DC reactor 21C and the other end is connected to an end of the DC power supply unit of the first DC reactor 21a via the diode 31, so as to apply the reactor voltage VDCL1 generated in the first DC reactor 21a. The capacitor voltage VC1 in the capacitor (C1) 32 is defined on the basis of the DC voltage VAB of the DC power supply unit and the transformer ratio of the transformer, and when the transformer ratio of the transformer 34 is (n2:n1), the set voltage is VC1=(n2/n1)×VAB. The diode 31 is connected such that a direction from the pulsing unit toward the capacitor (C1) 32 of the regeneration unit 30A is a forward direction, and when the reactor voltage VDCL1 of the first DC reactor 21a exceeds the capacitor voltage VC1 of the capacitor (C1) 32, the regeneration unit 30A regenerates a component of the reactor voltage VDCL1 that exceeds the capacitor voltage VC1 of the capacitor (C1) 32. In this way, the regeneration unit 30A performs the regeneration operation by using the capacitor voltage VC1 of the capacitor (C1) 32 as threshold, as with the cases of the first and second configuration examples.

As to the output voltage Vo, output is a voltage (Vo=VAB+VDCL1+VDCL2) obtained by superimposing the reactor voltage VDCL1 of the first DC reactor 21a and the reactor voltage VDCL2 of the second DC reactor 21b on the DC voltage VAB of the DC power supply unit. Since the reactor voltage VDCL1 of the first DC reactor 21a is clamped to the capacitor voltage VC1, the output voltage Vo is Vo=VAB+VC1+VDCL2. When a turns ratio of the first DC reactor 21a and the second DC reactor 21b is (n1p/n2p), the reactor voltages VDCL1 and VDCL2 are expressed by (VDCL1/VDCL2=n1p/n2p).

(Fourth Configuration of DC Pulse Power Supply Device)

A fourth configuration of the DC pulse power supply device of the present invention comprises, as with the first, second and third configurations, the DC power supply unit (DC unit) 10, a pulsing unit 20D that generates a pulse output by using the step-up chopper circuit connected to the DC power supply unit 10 so as to supply the generated pulse output to the load 4, the regeneration unit 30A that regenerates a component of the voltage that rises excessively in the pulsing unit 20D to the DC power supply unit 10, and the control circuit 40 that controls the DC power supply unit 10, the pulsing unit 20D and the regeneration unit 30A, the power supply device supplying the pulse output through the output cable 3 to the load 4.

Figure 9:
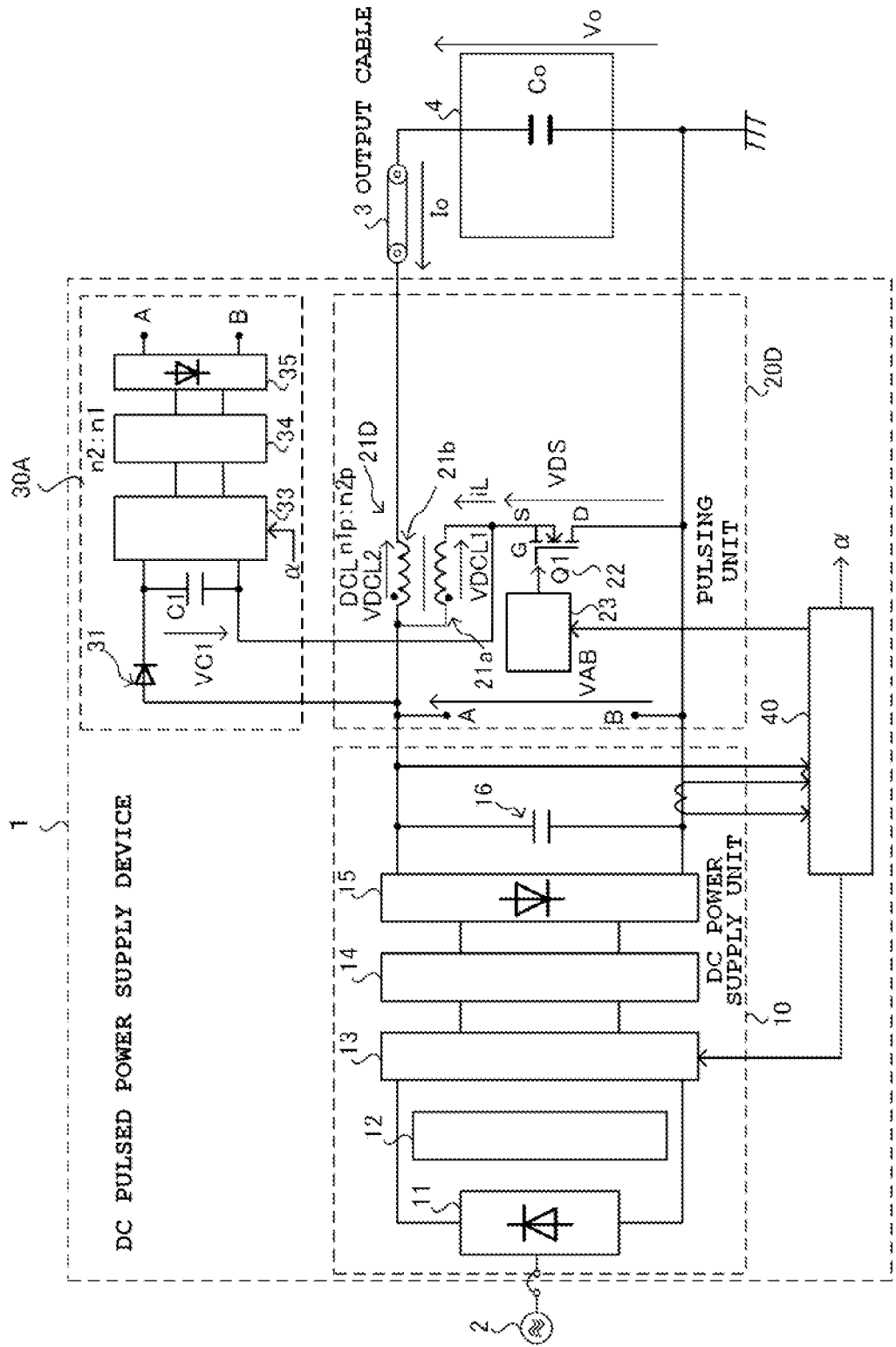
FIG. 9 illustrate a fourth configuration example of the DC pulse power supply device according to the invention.

A description will now be made about the fourth configuration example of the DC pulse power supply device of the invention by referring to FIG. 9. The fourth configuration example is different from the third configuration example in the transformer that constitutes the DC reactor of the step-up chopper circuit in the pulsing unit 20D, and is the same as the third configuration example in the other constituent elements.

The DC reactor 21C included in the step-up chopper circuit of the third configuration example is composed of the multi-winging transformer with the additive polarity.

By contrast, the DC reactor 21D of the fourth configuration example is composed of a multi-winding transformer with a subtractive polarity, instead of the multi-winding transformer with the additive polarity of the step-up chopper circuit of the third configuration example.

The DC reactor 21D of the multi-winding transformer is configured by connecting the magnetically coupled first DC reactor 21a and second DC reactor 21b in parallel. One end of the first DC reactor 21a is connected to the terminal A on the low-voltage side of the DC power supply unit, and the other end thereof is connected to the source S of the switching element 22. One end of the second DC reactor 21b is connected to the terminal A on the low-voltage side of the DC power supply unit, and the other end is connected to the load side.

When the switching element 22 is in the ON state, the end of the switching element 22 of the first DC reactor 21a of the DC reactor 21C is grounded, so that a current flows from the terminal B to the terminal A through the switching element 22 in the ON state and the first DC reactor 21a. At this time, electromagnetic energy is accumulated in the first DC reactor 21a.

Then, when the switching element 22 is turned from the ON state to the OFF state, a reactor current iL flown by the accumulated energy in the first DC reactor 21a of the DC reactor 21D causes the generation of the reactor voltage VDCL1 in the first DC reactor 21a, and the electromagnetic coupling of the second DC reactor 21b with the first DC reactor 21a causes the generation of the reactor voltage VDCL2 in the second DC reactor 21b. The step-up chopper circuit repeatedly changes the ON operation and the OFF operation of the switching element 22, thereby boosting the output voltage Vo as with the case of the first, second and third configuration examples.

A voltage ratio between the reactor voltage VDCL1 of the first DC reactor 21a and the reactor voltage VDCL2 of the second DC reactor 21b stands at a value corresponding to an inductance ratio between the first DC reactor 21a and the second DC reactor 21b. When a turns ratio of the multi-turning coils of the first DC reactor 21a and second DC reactor 21b of the DC reactor 21D is (n1p:n2p), the voltage ratio (VDCL1/VDCL2) between the reactor voltage VDCL1 of the first DC reactor 21a and the reactor voltage VDCL2 of the second DC reactor 21b stands at the turns ratio of (n1p/n2p).

The DC reactor 21D of the regeneration unit of the fourth configuration example acts in the similar manner to the DC reactor 21C of the third configuration example for the reactor voltage VDCL1 of the first DC reactor 21a of the DC reactor 21C. The regeneration unit 30A regenerates a component of the reactor voltage that exceeds the set voltage to the DC power supply unit when the reactor voltage exceeds the set voltage, so that the regeneration unit 30A can work as the clamp voltage unit for clamping the reactor voltage to the capacitor voltage VC1 of the capacitor (C1) 32. At this time, the clamp voltage in the clamp voltage unit is defined by the capacitor voltage VC1. The regeneration unit 30A, or clamp voltage unit 30, clamps high limit voltages at the source end of the switching element 22 and the output end of the DC pulse power supply unit to the capacitor voltage VC1 so as to prevent the excessive voltage from being applied to a drain-source voltage VDS in the switching element 22, thereby preventing the output voltage from fluctuating due to the fluctuation in a load current.

In the regeneration unit 30A, one end of the capacitor (C1) 32 is connected to an end of the switching element of the first DC reactor 21a of the DC reactor 21D and the other end is connected to an end of the DC power supply unit of the first DC reactor 21a via the diode 31, so as to apply the reactor voltage VDCL 1 generated in the first DC reactor 21a. The capacitor voltage VC1 in the capacitor (C1) 32 is defined on the basis of the DC voltage VAB of the DC power supply unit and the transformer ratio of the transformer, and when the transformer ratio of the transformer 34 is (n2:n1), a set voltage is VC1=(n2/n1)×VAB. The diode 31 is connected such that a direction from the pulsing unit toward the capacitor (C1) 32 of the regeneration unit 30A is a forward direction, and when the reactor voltage VDCL1 of the first DC reactor 21a exceeds the capacitor voltage VC1 of the capacitor (C1) 32, the regeneration unit 30A regenerates a component of the reactor voltage VDCL1 that exceeds the capacitor voltage VC1 of the capacitor (C1) 32. In this way, the regeneration unit 30A performs the regeneration operation by using the capacitor voltage VC1 of the capacitor (C1) 32 as threshold, as with the cases of the first, second and third configuration examples.

As to the output voltage Vo, output is a voltage (Vo=VAB+VDCL2) obtained by superimposing the reactor voltage VDCL2 of the second DC reactor 21b on the DC voltage VAB of the DC power supply unit. When a turns ratio between the first DC reactor 21a and the second DC reactor 21b is (n1p/n2p), the reactor voltage VDCL1 and the reactor voltage VDCL2 is expressed by (VDCL1/VDCL2=n1p/n2p). Thus, when the voltage VDCL1 is clamped to the voltage VC1, the output voltage Vo is expressed by Vo=VAB+VC1×(n1p/n2p).

(Fifth Configuration of DC Pulse Power Supply Device)

A fifth configuration of the DC pulse power supply device of the present invention comprises, as with the first configuration, the DC power supply unit (DC unit) 10, a pulsing unit 20E that supplies to the load 4 with a pulse output generated by the step-up chopper circuit connected to the DC power supply unit 10, the regeneration unit 30A that regenerates a component of a voltage that rises excessively in the pulsing unit 20E to the DC power supply unit 10, and the control circuit 40 that controls the DC power supply unit 10, the pulsing unit 20E and the regeneration unit 30A, the power supply device supplying the pulse output through the output cable 3 to the load 4.

Figure 10:
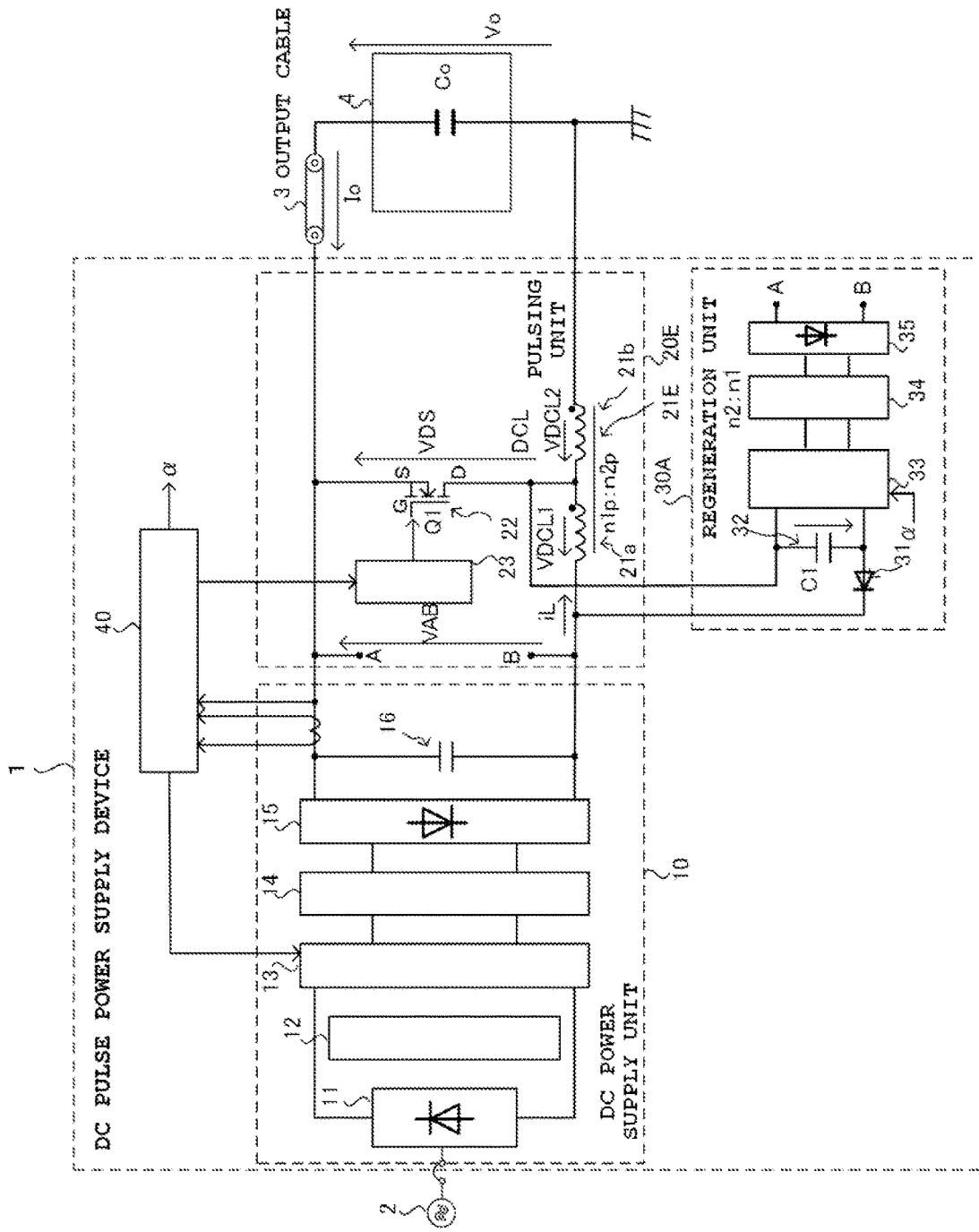
FIG. 10 illustrates a fifth configuration example of the DC pulse power supply device according to the invention.

A description will now be made about the fifth configuration example of the DC pulse power supply device of the invention by referring to FIG. 10. The fifth configuration example is different from the second configuration example in the arrangement of the DC reactor of the step-up chopper circuit, and is the same as the second configuration example in the other constituent elements. In the following, the difference from the second configuration example will be described, and the description about the other common elements will be omitted.

A DC reactor 21E included in the step-up chopper circuit of the fifth configuration example is composed of a trapped (sic) autotransformer, as with the DC reactor 21B of the step-up chopper circuit of the second configuration example. However, the DC reactor 21E differs in its arrangement with respect to a power line. The DC reactor 21B of the second configuration example is connected to a power line on the low-voltage side of the DC power supply unit, whereas the DC reactor 21E of the fifth configuration example is connected to a power line on the high-voltage side of the DC power supply unit.

The DC reactor 21E of the tapped autotransformer is configured by connecting the magnetically coupled first DC reactor 21a and second DC reactor 21b in series, and uses a connection point between the first DC reactor 21a and the second DC reactor 21b as tapping point. One end of the first DC reactor 21a is connected to the terminal B on the high-voltage side of the DC power supply unit, and one end of the second DC reactor 21b is connected to the load side and further grounded. The tapping point of the connection point of the first DC reactor 21a and the second DC reactor 21b is connected to the end of the drain D of the switching element 22.

When the switching element 22 is in the ON state, the tapping point of the connection point of the DC reactor 21E is grounded via the second DC reactor 21b, so that a current can flow from the terminal B to the terminal A through the first DC reactor 21a and the switching element 22 in the ON state. At this time, electromagnetic energy is accumulated in the first DC reactor 21a.

Then, when the switching element 22 is turned from the ON state to the OFF state, a reactor current iL flown by the accumulated energy in the first DC reactor 21a of the DC reactor 21E causes the generation of the reactor voltage VDCL1 in the first DC reactor 21a, while causing the generation of the reactor voltage VDCL2 in the second DC reactor 21b. The step-up chopper circuit repeatedly changes the ON state and the OFF state of the switching element 22, so as to boost the output voltage Vo as with the case of the first configuration example.

A voltage ratio between the reactor voltage VDCL1 of the first DC reactor 21a and the reactor voltage VDCL2 of the second DC reactor 21b stands at a value corresponding to an inductance ratio between the first DC reactor 21a and the second DC reactor 21b. When a turns ratio of a tapped single-winding coils of the first DC reactor 21a and second DC reactor 21b of the DC reactor 21E is n1p:n2p, the voltage ratio (VDCL1/VDCL2) between the reactor voltage VDCL1 of the first DC reactor 21a and the reactor voltage VDCL2 of the second DC reactor 21b stands at the turns ratio of (n1p/n2p).

The regeneration unit 30A of the fifth configuration example can act in the manner similar to the case in the first configuration example by employing the reactor voltage VDCL1 of the first DC reactor 21a of the DC reactor 21E instead of the reactor voltage VDCL of the DC reactor 21A of the first configuration example. The regeneration unit 30A regenerates a voltage component that exceeds a set voltage when the reactor voltage exceeds the set voltage, so as to work as the clamp voltage unit for clamping the reactor voltage to the capacitor voltage VC1 of the capacitor (C1) 32. At this time, the clamp voltage of the clamp voltage unit is defined by the capacitor voltage VC1. The regeneration unit 30A, or clamp voltage unit 30, clamps high limit voltages at the source end of the switching element 22 and the output end of the DC pulse power supply unit to the capacitor voltage VC1 so as to prevent the excessive voltage from being applied to the drain-source voltage VDS in the switching element 22, thereby preventing the output voltage from fluctuating due to the fluctuation in a load current.

In the regeneration unit 30A, one end of the capacitor (C1) 32 is connected to the connection point between the first DC reactor 21a and second DC reactor 21b of the DC reactor 21E and the other end is connected on the end part of the DC power supply unit of the first DC reactor 21a via the diode 31, thereby applying the reactor voltage VDCL1 generated in the first DC reactor 21a. The capacitor voltage VC1 of the capacitor (C1) 32 is defined based on the DC voltage VAB of the DC power supply unit and the transformer ratio of the transformer, and when the transformer ratio of the transformer 34 is (n2:n1), the set voltage is VC1=(n2/n1)×VAB. The diode 31 is connected such that a direction from the pulsing unit 20E toward the capacitor (C1) 32 of the regeneration unit 30A is a forward direction, and when the reactor voltage VDCL1 of the first DC reactor 21a exceeds the capacitor voltage VC1 of the capacitor (C1) 32, the regeneration unit 30A regenerates a component of the reactor voltage VDCL1 that exceeds the capacitor voltage VC1 of the capacitor (C1) 32. Thus, the regeneration unit 30A performs the regeneration operation by using the capacitor voltage VC1 of the capacitor (C1) 32 as threshold, as with the cases of the first configuration example.

As to the output voltage Vo, output is a voltage (Vo=VAB+VDCL1+VDCL2) obtained by superimposing the reactor voltage VDCL1 of the first DC reactor 21a and the reactor voltage VDCL2 of the second DC reactor 21b on the DC voltage VAB of the DC power supply unit. Since the voltage VDCL1 of the first DC voltage 21a is clamped to the capacitor voltage VC1, the output voltage Vo is expressed by Vo=VAB+VC1+VDCL2.

FIG. 5(b) shows, as with the second configuration example, the output voltage Vo in the regeneration state in the fifth configuration example. The DC pulse power supply device outputs the pulse output of the output voltage Vo with a period of switching the step-up chopper circuit as a pulse period T. The pulse output has, during the pulse period T, an ON period Ton in which the switching element is in the ON state and an OFF period Toff in which the switching element is in the OFF state. The value of the output voltage Vo during the ON period Ton corresponds to the reactor voltage VDCL2.

By contrast, the output voltage Vo in the OFF period Toff is obtained by superimposing the reactor voltage VDCL1 of the first DC reactor 21a and the reactor voltage VDCL2 of the second DC reactor 21b on the DC voltage VAB of the DC power supply unit, namely (VAB+VDCL1+VDCL2). However, the reactor voltage VDCL1 is clamped to the capacitor voltage VC1 so that the output voltage Vo stands at (VAB+VC1+VDCL2). Since the DC voltage VAB and the capacitor voltage VC1 are constant, the output voltage Vo of the pulse output is held near constant.

In FIG. 5(b), the parts indicated by the dashed line represent suppressed voltages. Since the regenerated capacitor voltage VC1 is clamped, the voltage VDCL1 to be applied to the source end of the switching element changes into the voltage VC1, and thereby a voltage of (VDCL1−VC1) is suppressed. Furthermore, since the reactor voltage VDCL1 is suppressed, a component (VDCL1−VC1)×(n2p/n1p) of the reactor voltage VDCL2 generated in the second DC reactor 21b is also suppressed according to the turns ratio. Thus, a clamped component of the output voltage is (VDCL1−VC1)×(1+n2p/n1p).

The description about the above embodiments and modifications are examples of the DC pulse power supply device in accordance with the present invention. The present invention is therefore not limited to the above embodiments and can be changed or modified in various ways on the basis of the ideas of the invention, and these variations are not excluded from the scope of the invention.

INDUSTRIAL APPLICABILITY

The DC pulsed power supply device of the present invention can be applied as power source for supplying electric power to a plasma generation device, and furthermore can be used as power supply device for supplying a pulse output to a load of a pulse laser-excitation system, electrical discharge machine or similar.

REFERENCE SIGNS LIST

1 DC Pulse Power Supply Device
2 AC Power Supply
3 Output Cable

4 Load
10 DC Power Supply Unit
11 Rectifier
12 Snubber Circuit
13 Single-Phase Inverter Circuit
14 Single-Phase Transformer
15 Rectifier
16 Capacitor
20, 20A, 20B, 20C, 20D, 20E Pulsing Unit
21, 21A, 21B, 21C, 21D, 21E DC Reactor
21a First DC Reactor
21b Second DC Reactor
21c Leakage Inductance
22 Switching Element
30 Clamp Voltage Unit
30A Regeneration Unit
31 Diode
32 Capacitor
33 Inverter Circuit
33a Bridge Circuit
33b Drive Circuit
34 Transformer
35 Rectifier
100 DC Pulse Power Supply Device
110 DC Power Supply
120 Step-Up Chopper circuit
121 Inductor
122 Switching Element
123 Diode
124 Resistor
125 DC Power Supply
QR1-QR4 Switching Element

The invention claimed is:

1. A DC pulse power supply device, comprising a DC power supply unit, and a pulsing unit that generates a pulse output by a step-up chopper circuit connected to the DC power supply unit, wherein
the step-up chopper circuit comprises a series circuit of a DC reactor and a switching element,
the DC pulse power supply device comprises a clamp voltage unit connected to the DC reactor,
an output end of the clamp voltage unit is connected to a connection point between the DC reactor and the switching element, so as to clamp a voltage across the switching element in an OFF period,
the clamp voltage unit includes a regeneration unit for regenerating a component of a reactor voltage of the DC reactor which exceeds a set voltage to the DC power supply unit,
the regeneration unit is connected between both ends of the DC reactor of the step-up chopper circuit, and a clamp voltage in the clamp voltage unit being the set voltage of the regeneration unit.

2. The DC pulse power supply device according to claim 1, wherein the regeneration unit comprises:
a capacitor connected in parallel with respect to the reactor voltage in the pulsing unit;
an inverter circuit that performs orthogonal transformation on a capacitor voltage in the capacitor;
a transformer that transforms an AC voltage in the inverter circuit; and
a rectifier that rectifies an AC voltage in the transformer, wherein
the regeneration unit uses the set voltage as the voltage across the capacitor to regenerate a component of a voltage that exceeds the voltage across the capacitor to the DC power supply unit, and
the clamp voltage being variable based on a transformer ratio of the transformer.

3. The DC pulse power supply device according to claim 1, wherein one end of the regeneration unit is connected to an input end on a low-voltage side of the pulsing unit, the reactor voltage in the DC reactor that refers to a voltage on the low-voltage side being used as a regeneration input voltage.

4. The DC pulse power supply device according to claim 2, wherein one end of the regeneration unit is connected to an input end on a low-voltage side of the pulsing unit, the reactor voltage in the DC reactor that refers to a voltage on the low-voltage side being used as a regeneration input voltage.

5. The DC pulse power supply device according to claim 1, wherein the DC reactor has a second DC reactor magnetically connected thereto,
the output end of the clamp voltage unit being connected to a connection point between the DC reactor and the second DC reactor.

6. The DC pulse power supply device according to claim 5, wherein one end of the DC reactor is connected to an output end of the DC power supply unit,
one end of the second DC reactor is connected to an output end of the pulsing unit, and
the connection point between the DC reactor and the second DC reactor is connected to a source of the switching element of the step-up chopper circuit.

7. The DC pulse power supply device according to claim 5, wherein the DC reactor and the second DC reactor consist of an autotransformer or a multi-winding transformer.

8. The DC pulse power supply device according to claim 6, wherein the DC reactor and the second DC reactor consist of an autotransformer or a multi-winding transformer.

* * * * *